US012280349B2

(12) United States Patent
Dhinojwala et al.

(10) Patent No.: US 12,280,349 B2
(45) Date of Patent: Apr. 22, 2025

(54) SELF-ASSEMBLED MELANIN PARTICLES FOR COLOR PRODUCTION

(71) Applicants: Ali Dhinojwala, Akron, OH (US);
Ming Xiao, Cambridge, MA (US);
Ziying Hu, Wilmette, IL (US);
Matthew Shawkey, Ghent (BE);
Nathan Gianneschi, Wilmette, IL (US)

(72) Inventors: Ali Dhinojwala, Akron, OH (US);
Ming Xiao, Cambridge, MA (US);
Ziying Hu, Wilmette, IL (US);
Matthew Shawkey, Ghent (BE);
Nathan Gianneschi, Wilmette, IL (US)

(73) Assignees: The University of Akron, Akron, OH (US); University of California, San Diego, San Diego, CA (US)

(*) Notice: Subject to any disclaimer, the term of this patent is extended or adjusted under 35 U.S.C. 154(b) by 0 days.

(21) Appl. No.: 17/943,667

(22) Filed: Sep. 13, 2022

(65) Prior Publication Data
US 2023/0080523 A1 Mar. 16, 2023

Related U.S. Application Data

(63) Continuation of application No. 16/462,768, filed as application No. PCT/US2017/062952 on Nov. 22, 2017, now abandoned.
(Continued)

(51) Int. Cl.
*B01J 13/18* (2006.01)
*B82Y 20/00* (2011.01)
(Continued)

(52) U.S. Cl.
CPC .......... *B01J 13/18* (2013.01); *C09B 67/0005* (2013.01); *C09B 67/0007* (2013.01);
(Continued)

(58) Field of Classification Search
None
See application file for complete search history.

(56) References Cited

U.S. PATENT DOCUMENTS

2004/0258759 A1* 12/2004 Suslick ............... A61K 49/001
424/490
2014/0254017 A1* 9/2014 Manoharan ............ G02B 5/286
252/586

(Continued)

FOREIGN PATENT DOCUMENTS

WO 2012110995 A1 8/2012
WO 2014132012 A1 9/2014

OTHER PUBLICATIONS

Written Opinion of the International Searching Authority in International Application No. PCT/US2017/062952 mailed May 7, 2018.
(Continued)

*Primary Examiner* — Jeffrey D Washville
(74) *Attorney, Agent, or Firm* — Renner, Kenner, Greive, Bobak, Taylor & Weber Co., LPA

(57) ABSTRACT

In various embodiments, the present invention is directed to a facile one-pot reverse emulsion process to assemble core-shell nanoparticles (CS-SMNPs) into bright and noniridescent photonic supraballs. In one or more embodiments, the present invention is directed to core-shell nanoparticles having an inner high refractive index (RI) core and an outer low RI shell. In one or more embodiment, the present invention includes core-shell nanoparticles using high RI (~1.74) melanin cores and low-RI (~1.45) silica shells. In various embodiments, these nanoparticles may be self-assembled into bright and noniridescent supraballs using a scalable one-pot reverse emulsion process. According to various embodiments of the present invention, it is possible to generate a full spectrum of structural colors with the
(Continued)

Non-close packing

Hollow melanosomes combination of only two ingredients, synthetic melanin and silica.

32 Claims, 9 Drawing Sheets

Related U.S. Application Data

(60) Provisional application No. 62/425,285, filed on Nov. 22, 2016.

(51) Int. Cl.
    *B82Y 30/00*     (2011.01)
    *B82Y 40/00*     (2011.01)
    *C09B 67/08*     (2006.01)
    *C09B 69/10*     (2006.01)

(52) U.S. Cl.
    CPC .............. *C09B 69/104* (2013.01); *B82Y 20/00* (2013.01); *B82Y 30/00* (2013.01); *B82Y 40/00* (2013.01)

(56) References Cited

U.S. PATENT DOCUMENTS

2015/0375429 A1     12/2015    Butt et al.
2016/0272883 A1     9/2016     Yamane et al.

OTHER PUBLICATIONS

C. M. Eliason, M. D. Shawkey, "A photonic heterostructure produces diverse iridescent colours in duck wing patches." J. R. Soc. Interface 9, 2279-2289 (2012).

C. M. Eliason, P.-P. Bitton, M. D. Shawkey, "How hollow melanosomes affect iridescent colour production in birds." Proc. Biol. Sci. 280, May 15, 2013 (2013).

M. D. Shawkey, L. D'Alba, M. Xiao, M. Schutte, R. Buchholz, "Ontogeny of an iridescent nanostructure composed of hollow melanosomes." J. Morphol. 276, 378-384 (2015).

J. B. Nofsinger, S. E. Forest, J. D. Simon, and "Explanation for the disparity among absorption and action spectra of eumelanin." J. Phys. Chem. B 103, 11428-11432 (1999).

A. Corani, A. Huijser, T. Gustavsson, D. Markovitsi, P.-Å. Malmqvist, A. Pezzella, M. d'Ischia, V. Sundström, "Superior photoprotective motifs and mechanisms in eumelanins uncovered." J. Am. Chem. Soc. 136, 11626-11635 (2014).

K. P. Velikov, A. Moroz, A. van Blaaderen, "Photonic crystals of core-shell colloidal particles." Appl. Phys. Lett. 80, 49-51 (2002).

Tomoya Higashihara, and Mitsuru Ueda, "Recent Progress in High Refractive Index Polymers" Macromolecules, 2015, 48 (7), pp. 1915-1929.

M. Xiao, Y. Li, M. C. Allen, D. D. Deheyn, X. Yue, J. Zhao, N. C. Gianneschi, M. D. Shawkey, A. Dhinojwala, "Bio-inspired structural colors produced via self-assembly of synthetic melanin nanoparticles." ACS Nano 9, 5454-5460 (2015).

M. C. W. van Rossum, T. M. Nieuwenhuizen, Multiple scattering of classical waves: Microscopy, mesoscopy, and diffusion. Rev. Mod. Phys. 71, 313-371 (1999).

P. Sheng, Introduction to Wave Scattering, Localization and Mesoscopic Phenomena, vol. 88 of Springer Series in Materials Science (Springer, 2006).

M. Reufer, L. F. Rojas-Ochoa, S. Eiden, J. J. Sáenz, F. Scheffold, "Transport of light in amorphous photonic materials." Appl. Phys. Lett. 91, 171904 (2007).

S. F. Liew, J. Forster, H. Noh, C. F. Schreck, V. Saranathan, X. Lu, L. Yang, R. O. Prum, C. S. O'Hern, E. R. Dufresne, H. Cao, "Short-range order and near-field effects on optical scattering and structural coloration." Opt. Express 19, 8208-8217 (2011).

M. S. Wertheim, "Exact solution of the Percus-Yevick integral equation for hard spheres." Phys. Rev. Lett. 10, 321-323 (1963).

M. Xiao, A. Dhinojwala, M. Shawkey, "Nanostructural basis of rainbow-like iridescence in common bronzewing Phaps chalcoptera feathers." Opt. Express 22, 14625-14636 (2014).

W. Stöber, A. Fink, E. Bohn, "Controlled growth of monodisperse silica spheres in the micron size range." J. Colloid Interface Sci. 26, 62-69 (1968).

Y. Zhang, E. Anim-Danso, S. Bekele, A. Dhinojwala, Effect of surface energy on freezing temperature of water. ACS Appl. Mater. Interfaces 8, 17583-17590 (2016).

\* cited by examiner

Non-close packing

Hollow melanosomes

SELF-ASSEMBLED MELANIN PARTICLES FOR COLOR PRODUCTION

CROSS REFERENCE TO RELATED APPLICATIONS

This application is a continuation of U.S. patent application Ser. No. 16/462,768, filed May 21, 2019, pending, which is a 371 national phase filing of International PCT Application No. PCT/US2017/062952, which claims the benefit of U.S. Provisional Patent Application No. 62/425,285, entitled "Self-Assembled Melanin Particles for Color Production," filed Nov. 22, 2016. All prior related applications are incorporated herein by reference in their entireties.

STATEMENT REGARDING FEDERALLY SPONSORED RESEARCH OR DEVELOPMENT SUPPORT

This invention was made with government support under contract numbers EAR-1251895 and DMR-1105370 awarded by the National Science Foundation and contract number FA9550-16-1-0222 awarded by the United States Air Force Office of Scientific Research. The government has certain rights in the invention.

FIELD OF THE INVENTION

One or more embodiments of the present invention relate to structural color systems. In certain embodiments, present invention relates to structural color systems using supraballs formed from self-assembled core-shell melanin nanoparticles.

BACKGROUND OF THE INVENTION

In the colorful world in which we live, colors are significant not only for aesthetics and pleasure but also for communication, signaling, and security. Colors are produced through either absorption of light by molecules (pigmentary colors) or scattering of light by nanostructures (structural colors). Because of their tunability, resistance to (photo or chemical) bleaching, and reduced dependence on toxic materials, structural colors are often superior to pigmentary colors. Structural colors enable the creation of a spectrum of nonfading colors without pigments, potentially replacing toxic metal oxides and conjugated organic pigments. Many recent studies have demonstrated the use of self-assembly to produce photonic crystals that generate colors across the visible spectrum, but there are still significant challenges. Many traditional structural colors are iridescent and thus are not useful for wide angle displays and recent examples of non-iridescent structural colors lack sufficient color saturation in the absence of absorbing materials (carbon black, gold nanoparticles, or black polypyrrole) to reduce incoherent scattering. Core-shell nanoparticles with a shell refractive index (RI) similar to water have been used to tune the spacing between cores to achieve optimal scattering for non-iridescent colors, but only in solution. Although both bottom-up self-assembly and top-down nanolithography methods have been widely used, significant challenges remain to achieve the contrast needed for a complete gamut of colors and a scalable process for industrial application.

Nature provides many spectacular examples of structural colors, such as green-winged teal (*Anas crecca*) wing feathers that use hexagonal nonclose-packed melanosomes (FIG. 1A) (See, C. M. Eliason, M. D. Shawkey, "A photonic heterostructure produces diverse iridescent colours in duck wing patches." *J. R. Soc. Interface* 9, 2279-2289 (2012), the disclosure of which is incorporated herein by reference) and wild turkey (*Meleagris gallopavo*) feathers with hollow, high-RI contrast melanosomes that brighten feather colors (FIG. 1B) (See, e.g., C. M. Eliason, P.-P. Bitton, M. D. Shawkey, "How hollow melanosomes affect iridescent colour production in birds." *Proc. Biol. Sci.* 280, 20131505 (2013) and M. D. Shawkey, L. D'Alba, M. Xiao, M. Schutte, R. Buchholz, "Ontogeny of an iridescent nanostructure composed of hollow melanosomes." *J. Morphol.* 276, 378-384 (2015), the disclosures of which are incorporated herein by reference in their entirety).

What is needed in the art are core-shell synthetic melanin nanoparticles (CS-SMNPs) that that can be used to produce a full range of bright, non-iridescent structural colors and a scalable process for their mass production.

SUMMARY OF THE INVENTION

In various embodiments, the present invention is directed to a facile one-pot reverse emulsion process to assemble core-shell nanoparticles (CS-SMNPs) into bright and noniridescent photonic supraballs. In one or more embodiments, the present invention is directed to core-shell nanoparticles having an inner high refractive index (RI) core and an outer low RI shell. It has been found that the use of melanin as the core material can increase the brightness and saturation of supraballs because of its unique combination of a high refractive index (RI) and broadband absorption of light. In one or more embodiment, the present invention includes core-shell nanoparticles using high RI (~1.74) melanin cores and low-RI (~1.45) silica shells. In various embodiments, these nanoparticles may be self-assembled into bright and noniridescent supraballs using a scalable one-pot reverse emulsion process. According to various embodiments of the present invention, it is possible to generate a full spectrum of structural colors with the combination of only two ingredients, synthetic melanin and silica.

It is believed that CS-SMNP supraballs according to various embodiments of the present invention could be directly added to paints, plastics, and coatings and also used in ultraviolet-resistant inks. In addition, melanin is known to be biocompatible and to be able to dissipate almost 90% of the ultraviolet (UV) radiation into heat within a nanosecond (See, J. B. Nofsinger, S. E. Forest, J. D. Simon, and "Explanation for the disparity among absorption and action spectra of eumelanin." *J. Phys. Chem.* B 103, 11428-11432 (1999) and A. Corani, A. Huijser, T. Gustavsson, D. Markovitsi, P.-Å. Malmqvist, A. Pezzella, M. d'Ischia, V. Sundström, "Superior photoprotective motifs and mechanisms in eumelanins uncovered." *J. Am. Chem. Soc.* 136, 11626-11635 (2014), the disclosures of which are incorporated herein by reference in their entirety), making these melanin-based supraballs of the present invention suitable for use in cosmetics and/or UV-resistant inks.

In a first aspect, the present invention is directed to a core-shell nanoparticle for providing structural color comprising an inner high refractive index (RI) core and an outer low RI shell. In one or embodiment of this aspect of the invention the inner high RI core comprises melanin and the outer low RI shell comprises silica.

In one or more embodiments, core-shell nanoparticle of the present invention includes any one or more of the above referenced embodiments of the first aspect of the present invention wherein the melanin core has a diameter from about 50 nm to about 500 nm, and preferably from about 120 nm to about 220 nm. In one or more embodiments, core-shell nanoparticle of the present invention includes any one or more of the above referenced embodiments of the first aspect of the present invention wherein the silica shell has a thickness of from about 0 nm to about 200 nm, and preferably from about 0 nm to about 80 nm. In one or more embodiments, core-shell nanoparticle of the present invention includes any one or more of the above referenced embodiments of the first aspect of the present invention wherein the ratio of the diameter of the melanin core to the diameter of the core shell synthetic melanin particle is from about 0 to about 1.

In one or more embodiments, core-shell nanoparticle of the present invention includes any one or more of the above referenced embodiments of the first aspect of the present invention wherein the core-shell nanoparticle has a diameter of from about 50 nm to about 700 nm, and preferably from about 160 nm to about 300 nm. In one or more embodiments, core-shell nanoparticle of the present invention includes any one or more of the above referenced embodiments of the first aspect of the present invention wherein the core-shell nanoparticle has a refractive index (RI) of from about 1.40 to about 2.0, and preferably from about 1.4 to about 1.8.

In one or more embodiments, core-shell nanoparticle of the present invention includes any one or more of the above referenced embodiments of the first aspect of the present invention wherein the outer low RI shell comprises silica, polymers, cross linkable polymers, inorganic coatings, biological materials or a combination thereof. In one or more embodiments, core-shell nanoparticle of the present invention includes any one or more of the above referenced embodiments of the first aspect of the present invention further comprising a surface to which a material selected from the group consisting of cross linkable polymers, polar coatings, inorganic coatings, biological materials and a combination thereof are grafted or attached.

In a second aspect, the present invention is directed to a method of making the core-shell synthetic melanin nanoparticles of the first aspect of the present invention comprising: preparing a synthetic melanin nanoparticle by the oxidative polymerization of dopamine in the presence of a base; and depositing a silica shell ($SiO_2$) on the synthetic melanin nanoparticle to form the core-shell synthetic melanin nanoparticle described above. In one or more embodiments, the method of making the core-shell synthetic melanin nanoparticles of the first aspect of the present invention includes any one or more of the above referenced embodiments of the second aspect of the present invention wherein the synthetic melanin nanoparticle prepared has a diameter of from about 100 nm to about 200 nm. In one or more embodiments, the method of making the core-shell synthetic melanin nanoparticles of the first aspect of the present invention includes any one or more of the above referenced embodiments of the second aspect of the present invention wherein the silica shell deposited on the synthetic melanin nanoparticle has a thickness of from about 0 nm to about 200 nm, and preferably from about 0 nm to about 80 nm.

In one or more embodiments, the method of making the core-shell synthetic melanin nanoparticles of the first aspect of the present invention includes any one or more of the above referenced embodiments of the second aspect of the present invention wherein the step of depositing a silica shell comprises: dispersing the synthetic melanin nanoparticle in a mixture of 2-proponol and water with a volume ratio of 1:0.176; adding an ammonia solution to the dispersion; and adding tetraethyl orthosilicate (TEOS) into the mixture to form a $SiO_2$ shell on the surface of SMNPs due to the hydrolysis and condensation of TEOS onto the surface of the SMNPs under a base environment. In one or more embodiments, the method of making the core-shell synthetic melanin nanoparticles of the first aspect of the present invention includes any one or more of the above referenced embodiments of the second aspect of the present invention wherein the step of forming a $SiO_2$ shell on the surface of SMNPs further comprises controlling the thickness of the silica shell deposited on the synthetic melanin nanoparticle by varying the amount of tetraethyl orthosilicate (TEOS) used to form the silica shell and/or by varying the reaction time for the hydrolysis reaction to obtain a core-shell synthetic melanin nanoparticle that when formed into a supraball will display a desired structural color.

In a third aspect, the present invention is directed to a scalable process for the production of structural colors containing the nanoparticle of the first aspect of the present invention comprising: preparing a plurality of core-shell nanoparticles, having a polar or nonpolar outer surface; suspending the plurality of core-shell nanoparticles in a polar or non-polar liquid, depending on the polarity of the outer surface; adding an amphiphilic liquid to the core-shell nanoparticle suspension to provide a two-phase mixture having a first phase comprising the amphiphilic liquid and a second phase comprising the core-shell nanoparticle suspension, wherein the amphiphilic liquid is not soluble in the core-shell nanoparticle suspension but the polar or non-polar liquid in the core-shell nanoparticle suspension is at least partially soluble in the amphiphilic liquid; forming an emulsion from the two phase mixture, the emulsion having a phase comprising the amphiphilic liquid and an inner phase comprising the core-shell nanoparticle suspension; allowing the polar or non-polar liquid in the plurality of droplets to be absorbed into the continuous phase to produce a plurality of supraballs comprising closely packed core-shell nanoparticles suspended in the continuous phase; and removing the amphiphilic liquid to produce a powder comprising the supraballs that display a structural color and contain the core-shell nanoparticles of the first aspect of the present invention as described above. In one or more of these embodiments, the plurality of core-shell nanoparticles comprises a melanin inner core and an outer silica shell.

In one or more embodiments, scalable process for the production of structural colors containing the nanoparticle of the first aspect of the present invention includes any one or more of the above referenced embodiments of the third aspect of the present invention wherein the plurality of core-shell nanoparticles comprises a combination of two or more sets of core-shell synthetic, wherein each set of the two or more sets of core-shell nanoparticles would each display a different structural color if formed into a supraball. In one or more embodiments, scalable process for the production of structural colors containing the nanoparticle of the first aspect of the present invention includes any one or more of the above referenced embodiments of the third aspect of the present invention further comprising adding one or more nanoparticles selected from the group consisting of carbon black, inorganic pigments, quantum dots, UV stabilizers, polymer nanoparticles, inorganic particles, solid silica nanoparticles, solid synthetic melanin nanoparticles, core-shell melanin nanoparticles, and combinations thereof to the core-shell nanoparticle suspension.

In one or more embodiments, scalable process for the production of structural colors containing the nanoparticle of the first aspect of the present invention includes any one or more of the above referenced embodiments of the third aspect of the present invention wherein the polar or non-polar liquid is water or an aqueous solution. In one or more embodiments, scalable process for the production of structural colors containing the nanoparticle of the first aspect of the present invention includes any one or more of the above referenced embodiments of the third aspect of the present invention wherein the polar or non-polar liquid is primary, secondary, tertiary alcohol, or anilines, 1-octanol, 1-pentanol, 1-hexanol, 1-heptanol, phenols, 1-decanol, or a combination thereof.

In one or more embodiments, scalable process for the production of structural colors containing the nanoparticle of the first aspect of the present invention includes any one or more of the above referenced embodiments of the third aspect of the present invention wherein the plurality of core-shell nanoparticles are suspended in a non-polar liquid and the step of forming an emulsion and the step of allowing the polar or non-polar liquid in the plurality of droplets to be absorbed into the continuous phase are performed in a vessel having a hydrophobic inner surface. In one or more embodiments, scalable process for the production of structural colors containing the nanoparticle of the first aspect of the present invention includes any one or more of the above referenced embodiments of the third aspect of the present invention wherein the plurality of core-shell nanoparticles is suspended in a polar liquid and the step of forming an emulsion and the step of allowing the polar or non-polar liquid in the plurality of droplets to be absorbed into the continuous phase are performed in a vessel having a lipophobic inner surface.

In one or more embodiments, scalable process for the production of structural colors containing the nanoparticle of the first aspect of the present invention includes any one or more of the above referenced embodiments of the third aspect of the present invention wherein the concentration of the plurality of core-shell nanoparticles in the core-shell nanoparticles suspension is from about 1 mg/ml to about 100 mg/ml, and preferably from about 20 mg/ml to about 80 mg/ml. In one or more embodiments, scalable process for the production of structural colors containing the nanoparticle of the first aspect of the present invention includes any one or more of the above referenced embodiments of the third aspect of the present invention wherein the amphiphilic liquid has an interfacial energy with water of from about 2 mJ/m$^2$ to about 55 mJ/m$^2$, and preferably from about 5 mJ/m$^2$ to about 15 mJ/m$^2$.

In one or more embodiments, scalable process for the production of structural colors containing the nanoparticle of the first aspect of the present invention includes any one or more of the above referenced embodiments of the third aspect of the present invention wherein the step of forming an emulsion is performed using a digital vortex to disperse the core-shell nanoparticles suspension into droplets within the amphiphilic liquid and the step of allowing the polar or non-polar liquid in the plurality of droplets to be absorbed into the continuous phase is performed by reducing the shaking speed of the digital vortex.

In one or more embodiments, scalable process for the production of structural colors containing the nanoparticle of the first aspect of the present invention includes any one or more of the above referenced embodiments of the third aspect of the present invention wherein the step of removing the amphiphilic liquid to produce a powder comprises: concentrating the supraballs in the amphiphilic liquid using by centrifugation and removing the amphiphilic liquid supernatant; and removing the remaining amphiphilic liquid to produce the supraball powder. In one or more embodiments, scalable process for the production of structural colors containing the nanoparticle of the first aspect of the present invention includes any one or more of the above referenced embodiments of the third aspect of the present invention further comprising repeating the steps above using second set of core-shell synthetic melanin nanoparticles to produce a second powder having a second structural color that is different from the structural color of the first powder; and combining the second powder with the first powder to produce a third powder that displays a third structural color comprised of the structural color of the first powder and the structural color of the second powder.

In a fourth aspect, the present invention is directed to a scalable process for the production of structural colors containing the core-shell nanoparticle of the first aspect of the present invention comprising preparing a plurality of core-shell synthetic melanin nanoparticles; suspending the plurality of core-shell synthetic melanin nanoparticles in water or an aqueous solution; adding an amphiphilic liquid to the suspension provide a two-phase mixture having an oil phase comprising the amphiphilic liquid and a water phase comprising the suspension, wherein the amphiphilic liquid is not soluble in the suspension but the water or aqueous solution is at least partially soluble in the amphiphilic liquid; forming a water-in-oil emulsion from the two phase mixture, the water-in-oil emulsion having an oil phase comprising the amphiphilic liquid and a water phase comprising the core-shell synthetic melanin nanoparticle suspension; and allowing the water or aqueous solution in the plurality of water droplets to be absorbed into the oil phase to produce a plurality of supraballs comprising closely-packed core-shell synthetic melanin nanoparticles that were suspended in the oil phase; removing the amphiphilic liquid to produce a powder comprising the supraballs that display a structural color and contain the core-shell synthetic melanin nanoparticles of the first aspect of the present invention.

In a another aspect, the present invention is directed to a method for providing supraballs that show a desired structural color using the core-shell synthetic nanoparticles of the first aspect of the present invention comprising varying the thickness of the outer low RI shell of the core-shell nanoparticles to arrive at core-shell nanoparticles that will show the desired structural color when formed into a supraball, wherein an increase in outer low RI shell thickness results in an increase in the wavelength of the color displayed and a decrease in outer low RI shell thickness results in a decrease in the wavelength of the color of the supraballs. In one or more of these embodiments, the core-shell nanoparticles are core-shell synthetic melanin nanoparticles and the outer low RI shell comprises silica.

In a yet another aspect, the present invention is directed to a method of controlling the wavelength of visible light displayed by the core-shell nanoparticle of the first aspect of the present invention comprising varying the ratio of the diameter of the melanin core to the diameter of the core shell synthetic melanin particle to arrive at core-shell synthetic melanin nanoparticles that will display the desired structural color when formed into a supraball, wherein an increase in the ratio of the diameter of the melanin core to the diameter of the core shell synthetic melanin particle results in an increase in the wavelength of the color displayed and a decrease in the ratio of the diameter of the melanin core to the diameter of the core shell synthetic melanin particle results in a decrease in the wavelength of the color displayed by the supraballs. In one or more of these embodiments, the core-shell nanoparticles are core-shell synthetic melanin nanoparticles and the outer low RI shell comprises silica.

BRIEF DESCRIPTION OF THE DRAWINGS

For a more complete understanding of the features and advantages of the present invention, reference is now made to the detailed description of the invention along with the accompanying figures.

FIGS. 7A-C are optical images, SEM images of top surface of supraballs, and cross-sectional TEM images for supraballs from binary CS-SMNPs consisting of 160/0- and 160/36-nm CS-SMNPs (FIG. 7A), 160/0- and 160/66-nmCS-SMNPs (FIG. 7B), and 160/36- and 160/66-nm CS-SMNPs (FIG. 7C). The mixing ratio was 1:1 by mass. Top: Real images of supraballs made of mixed CS-SMNPs and sketches of supraballs, illustrating the organization of CS-SMNPs. Scale bars, 500 nm.

FIG. 8A shows reflectance spectra and optical images for individual supraballs consisting of 224-nm pure silica nanoparticles (line 1, cyan supraball), 160/0-nmCS-SMNPs (line 2, purple supraball), 160/36-nm CS-SMNPs (line 3, olive supraball), and 160/66-nm CS-SMNPs (line 4, red supraball). The shaded area indicates the SD from 12 samples, plotted using pavo package in R. Each black box in the insets represents the size of the area probed by the optical measurements (4×4 mm) FIG. 8B shows angle-resolved spectra for olive inks (160/36-nm CS-SMNPs) with the inset scheme showing the setup for angle-resolved backscattering measurements where a=15° as fixed and varied angle Θ between the source and the sample from 40° to 90°; and FIG. 8C shows the results of FDTD simulations of normal reflectance spectra from supraballs consisting of three different sizes of CS-SMNPs, where absorption of melanin was considered.

FIG. 10A shows the real and imaginary refractive indices for synthetic melanin particles used in the FDTD calculations and FIG. 10B is a comparisons of theoretical normal reflectance spectra (FDTD) for supraballs composed of three different sizes of CS-SMNPs with (solid lines) and without (dash lines) considering absorption of melanin.

FIG. 12A shows reflectance of single supraballs made of pure 160/0-nm, mixed 160/0-nm & 160/36-nm CS-SMNPs, and mixed 160/0-nm & 160/66-nm CS-SMNPs and FIG. 12B shows reflectance of single supraballs made of pure 160/36-nm CS-SMNPs, pure 160/66-nm CS-SMNPs, and mixed 160/36-nm & 160/66-nm CS-SMNPs.

DETAILED DESCRIPTION OF THE ILLUSTRATIVE EMBODIMENTS

Figure 1A:
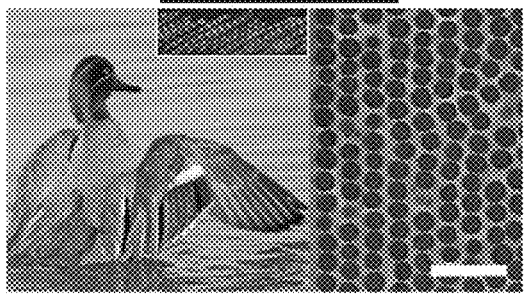
FIGS. 1A-B show two biological examples of enhances color brightness in melanin particles showing a green-winged teal (*Anas crecca*) wing feather and a cross-sectional transmission electron microscopy (TEM) image of a single barbule (FIG. 1A) and an iridescent wild turkey (*M. gallopavo*) wing feather and a cross-sectional TEM image of a single barbule (FIG. 1B). Scale bars, 500 nm. The photos of teal (credit to F. Pestana) and turkey (credit to T. Llovet) are from flickr.com under license numbers CCBY-SA 2.0 (https://creativecommons.org/licenses/by-sa/2.0/) and CCBY 2.0 (https://creativecommons.org/licenses/by/2.0/).
Figure 1B:
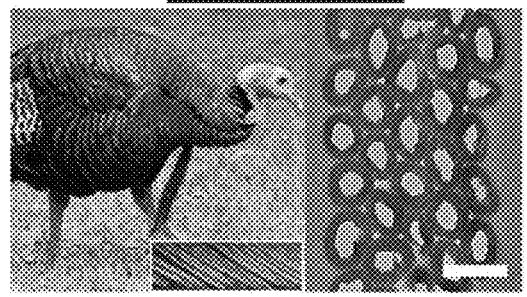

Inspired synergistically by non-close packing of the melanosomes in teal feathers (FIG. 1A) and the hollow melanosomes in turkey feathers (FIG. 1B), as well as theoretical FDTD modeling, various embodiments of the present invention are directed to core-shell nanoparticles that can self-assemble into micrometer-sized colorful supraballs through a one-pot, scalable reverse emulsion process. In various embodiments, the core-shell nanoparticles are comprised of a nanoparticle core, usually formed from a synthetic organic core, such as a synthetic melanin nanoparticle (SMNP) core, having a relatively high refractive index (RI) and an outer shell or coating having a relatively low RI. In some of these embodiments, the core-shell nanoparticles are core-shell synthetic melanin nanoparticles (CS-SMNPs) and while the core-shell nanoparticles of the present invention are often discussed herein as CS-SMNPs, it should be understood that other high RI core materials other than melanin may be used in some embodiments.

It has been found that by controlling the space between these nanoparticle cores when these core-shell nanoparticles are formed into supraballs, it is possible to produce supraballs with tunable structural colors across the entire visible spectrum. Moreover, it has also been found that structures having high-RI cores and low-RI shells, like the CS-SMNPs of the present invention, have increased reflectance to produce brighter colors. In particular, the use of melanin as the nanoparticle core material has been found to provide the required RI contrast between the cores and the shells and the broad absorption it provides helps to enhance the color saturation by absorbing incoherent scattering.

In addition to all the optical merits of using CS-SMNPs, the reverse emulsion method of fabricating CS-SMNP supraballs according to various embodiments of the present invention is simple, fast, and easily scalable. Further, it has been found that similar to the mixing of pigmentary colors, one can match a desired color by simply mixing CS-SMNPs or the supraballs made therefrom. The colors can be further modified by the addition of additional nanoparticles, which can easily be added to the supraballs. It is believed that this novel two-component (core-shell) strategy (a high RI material like melanin and a low RI material like silica) has the potential to revolutionize the use of structural colors in place of toxic organic and metal based pigments. It is believed that these supraballs could be directly added to paints, plastics, food colorings, 3D printable resins, and coatings, among other things, and could also be modified for use in such things as textiles, electronics, displays, sensors and ultraviolet-resistant inks or cosmetics.

In a first aspect, the present invention is directed to a core-shell nanoparticle (CS-SMNP) having a high RI nanoparticle core, preferably formed from a synthetic organic material such as synthetic melanin, and a low RI shell, preferably comprised of silica, that produce structural color. It has been found that the color displayed by these core-shell nanoparticles is determined principally, but not solely, by the spacing and the regularity of the spacing between the melanin nanoparticle cores when they self-assemble, as in the supraballs of the present invention described below. In one or more embodiments, it has been found that this spacing is regulated by the thickness of the low RI shell. In some other embodiments, it has been found that this spacing is regulated by the ratio of the core diameter and the shell thickness or the core diameter to the overall diameter. In still other embodiments, it has been found that this spacing may be regulated by polymers, inorganic coatings or biological materials grafted onto or otherwise adhered to the shells of the core-shell nanoparticles or directly to the high RI nanoparticle cores. In still other embodiments, it has been found that this spacing may be regulated by the addition of other nanoparticles into the supraballs.

As will be appreciated, the core-shell nanoparticles and supraballs of the present invention are not luminescent, in that they do not generate light, let alone colored light. When applied to the supraballs of the various embodiments of the present invention, the terms "display" and "produce" when used in reference to colors or wavelengths of light refers to colors or wavelengths of light produced when a structure scatters and redistributes white light and when applied to the core-shell nanoparticles of the various embodiments of the present invention, these terms refer to the color or wavelengths of light that would be "displayed" or "produced" by supraballs prepared using those CS-SMNPs.

Figure 1C:
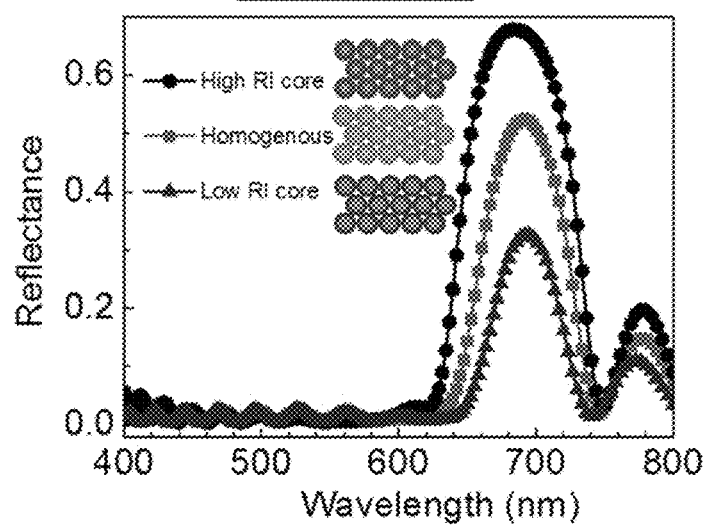
FIGS. 1C-D are graphs showing normal reflectance spectra from the (111) plane of FCC lattices made of core-shell nanoparticles and homogeneous nanoparticles with similar sizes and equivalent refractive indices: high-RI core/low-RI shell nanoparticles (core: RI, 1.74; diameter, 200 nm; shell: RI, 1.45; thickness, 50 nm), equivalent homogeneous nanoparticles (RI, 1.54; diameter, 300 nm), and low-RI core/high-RI shell nanoparticles (core: RI, 1.45; diameter, 267 nm; shell: RI, 1.74; thickness, 16.5 nm) (FIG. 1A) and the reflectance intensity ratio between core-shell and homogeneous structures changes as the ratio of core radius to core-shell nanoparticle total radius is varied (FIG. 1B).

The design of the core-shell morphology for producing colors of these nanoparticles was guided by finite-difference time-domain (FDTD) simulations. FDTD was used as a method to calculate the theoretical reflectance spectra (normal incidence) from the (111) plane of the most common photonic crystal with a face-centered cubic (FCC) packing composed of core-shell nanoparticles and homogeneous nanoparticles (see Example 1). It was found that relative to the lattice of homogeneous nanoparticles, the lattice of core-shell nanoparticles with high-RI cores and low-RI shells provides the maximum intensity at a similar wavelength, but has higher reflectance (FIG. 1C). In contrast, a reverse core-shell structure consisting of low-RI cores and high-RI shells was been found to have a much lower reflectance than the lattice of homogeneous nanoparticles. These findings were consistent with previously reported photonic bandgap calculations (see, e.g., K. P. Velikov, A. Moroz, A. van Blaaderen, "Photonic crystals of core-shell colloidal particles." *Appl. Phys. Lett.* 80, 49-51 (2002), the disclosure of which is incorporated herein by reference in its entirety).

Figure 1D:
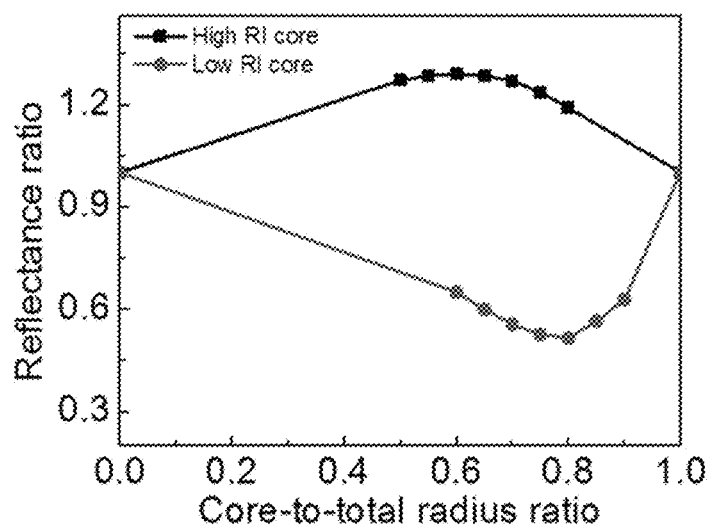

By varying the ratio of core-to-total radius, it was found that the highest reflectance (~130% relative to homogeneous nanoparticles) for high-RI core/low-RI shell structure when the core radius is ~60% of the radius of the whole core-shell nanoparticle. The lowest reflectance (~52% relative to homogeneous nanoparticles) for core-shell nanoparticles with low-RI cores is obtained when the core radius is ~80% of the whole core-shell nanoparticle (FIG. 1D).

On the basis of these results, nanoparticles were designed with high-RI synthetic organic cores and low-RI shells to obtain higher reflectance and brighter colors. As used herein, the terms "refractive index" and "RI" are used interchangeably to refer to the ratio of the velocity of light in a vacuum to its velocity in a specified material. The term "high refractive index" or "high RI," as used herein, refer to a refractive index of 1.7 or higher, as measured by refractometer, and for these purposes, is generally from about 1.7 to about 2.0. In one or more embodiments, the refractive index may be calculated using an Abbe refractometer. High RI synthetic organic cores may include melanin or halogen-containing or sulfur containing aromatic polymers. See, Tomoya Higashihara, and Mitsuru Ueda, "Recent Progress in High Refractive Index Polymers" *Macromolecules,* 2015, 48 (7), pp 1915-1929, the disclosure of which is incorporated herein by reference in its entirety.

As set forth above, synthetic melanin is preferred as a core material because it has an unusual combination of a high RI (~1.74) and a broadband absorption in the visible spectral region that reduces incoherent scattering, thereby enhancing color purity. In addition, synthetic melanin is environmental friendly and biocompatible, compared to other high RI polymers The material used for the shell is not particularly limited provided that it has a low refractive index (low-RI). As used herein, a "low-RI" is an RI of less than 1.7 as measured by refractometer and for these purposes is generally from about 1.3 to about 1.6. Suitable materials for the shell of the CS-SMNPs of various embodiments of the present invention may include, without limitation, silica, Titanium dioxide, polystyrene, poly(methyl methacrylate), poly(methyl methacrylate) chitin, keratin, or combinations thereof. In one or more embodiments, silica (RI, ~1.45) may be used as the low-RI shell material. As set forth in more detail below, in one or more embodiments, a sol-gel reaction may be used to coat silica onto synthetic melanin cores to produce CS-SMNPs (See, FIG. 2A). In one or more embodiment, the present invention is directed to core-shell nanoparticles having high refractive index (RI) (~1.74) melanin cores and low-RI (~1.45) silica shells that produce structural color.

As will be apparent, the CS-SMNPs of the present invention are generally nano scale in size and will have diameters from about 50 nm to about 700 nm. In one or more embodiments, the CS-SMNPs of the present invention will have diameters from about 50 nm to about 600 nm, in other embodiments, from about 50 nm to about 500 nm, in other embodiments, from about 50 nm to about 400 nm, in other embodiments, from about 50 nm to about 300 nm, in other embodiments, from about 100 nm to about 700 nm, in other embodiments, from about 200 nm to about 700 nm, and in other embodiments, from about 300 nm to about 700 nm. In some embodiments, the CS-SMNPs of the present invention will have diameters from about 160 nm to about 300 nm.

In one or more embodiments, the CS-SMNPs of the present invention will have a refractive index (RI) of from about 1.40 to about 2.0, and preferably from about 1.4 to about 1.8. In some embodiments, the CS-SMNPs of the present invention will have a refractive index (RI) of from about 1.50 to about 2.0, in other embodiments, from about 1.6 to about 2.0, in other embodiments, from about 1.7 to about 2.0, in other embodiments, from about 1.4 to about 1.8, in other embodiments, from about 1.4 to about 1.7, in other embodiments, from about 1.4 to about 1.6.

In various embodiments, the melanin core of the CS-SMNPs of the present invention will have a diameter of from about 50 nm to about 500 nm. In one or more embodiments, the melanin core of the CS-SMNPs of the present invention will have diameters from about 50 nm to about 400 nm, in other embodiments, from about 50 nm to about 300 nm, in other embodiments, from about 50 nm to about 200 nm, in other embodiments, from about 100 nm to about 500 nm, in other embodiments, from about 150 nm to about 500 nm, in other embodiments, from about 200 nm to about 500 nm, and in other embodiments, from about 300 nm to about 500 nm. In some embodiments, the melanin core of the CS-SMNPs of the present invention will have diameters from about 120 nm to about 220 nm. Further, as will be apparent, melanin cores having diameters above 500 nm will lead to near IR reflectance and may be useful for thermal regulation.

In various embodiments, the low-RI shells of the CS-SMNPs of the present invention will have a thickness of from about 0 nm to about 200 nm. In one or more embodiments, the low-RI shells of the CS-SMNPs of the present invention will have thickness from about 10 nm to about 200 nm, in other embodiments, from about 20 nm to about 200 nm, in other embodiments, from about 40 nm to about 200 nm, in other embodiments, from about 80 nm to about 200 nm, in other embodiments, from about 0.5 nm to about 150 nm, in other embodiments, from about 0.5 nm to about 100 nm, and in other embodiments, from about 0.5 nm to about 75 nm. In some embodiments, the low-RI shells of the CS-SMNPs of the present invention will have a thickness from about 0 nm to about 80 nm. In some embodiments, the low-RI shells of the CS-SMNPs of the present invention will have a thickness from about 35 nm to about 66 nm.

In one or more embodiments, the ratio of the low-RI shell to the overall diameter of the CS-SMNPs of the present invention is from about 0:1 to about 1:1. In some embodiments, the ratio of the low-RI shell to the overall diameter of the CS-SMNPs of the present invention may be from about 0.2:1 to about 1:1, in other embodiments, from about 0.4:1 to about 1:1, in other embodiments, from about 0.6:6 to about 1:1, in other embodiments, from about 0.8:1 to about 1:1, in other embodiments, from about 0.9:1 to about 1:1, in other embodiments, from about 0.3:1 to about 0.9:1, and in other embodiments, from about 0.5:1 to about 0.8:1.

In various embodiments, the CS-SMNPs of the present invention can be made first making synthetic melanin nanoparticles of a desired size to serve as the core of the CS-SMNPs. The method for making these particles is not particularly limited and any suitable method known in the art may be used. In one or more embodiments, the synthetic melanin nanoparticles may be prepared by the oxidative polymerization of dopamine in the presence of a base as set forth in M. Xiao, Y. Li, M. C. Allen, D. D. Deheyn, X. Yue, J. Zhao, N. C. Gianneschi, M. D. Shawkey, A. Dhinojwala, "Bio-inspired structural colors produced via self-assembly of synthetic melanin nanoparticles." *ACS Nano* 9, 5454-5460 (2015), the disclosure of which is incorporated herein by reference in its entirety.

These synthetic melanin nanoparticles (SMNPs) are then coated with a low-RI material such as silicon oxide (or silica). The method for coating the SMNPs to form the CS-SMNPs of the present invention is not particularly limited and any suitable method known in the art may be used. In various embodiments, a silica shell ($SiO_2$) is coated onto the surface of SMNPs core via the modified Stöber method (See FIG. 2). In these embodiments, SMNPs are first dispersed in a mixed solution of 2-propanol and deionized water using ultrasound and magnetic stirring. Next, an ammonia solution ($NH_4OH$, pH>10.6) is added and the mixture is stirred. The silica precursor, tetraethyl orthosilicate (TEOS), is then injected continuously into the mixture to form $SiO_2$ shells on the surface of SMNPs due to the hydrolysis and condensation of TEOS under alkaline conditions. In these embodiments, the reaction is conducted at room temperature under constant stirring for from about 30 min to about 24 h to form the CS-SMNPs of the present invention. The CS-SMNPs are then collected by centrifuge, washed with deionized water, and then re-dispersed in deionized water for future use in supraball preparation as set forth below.

Figure 3A:
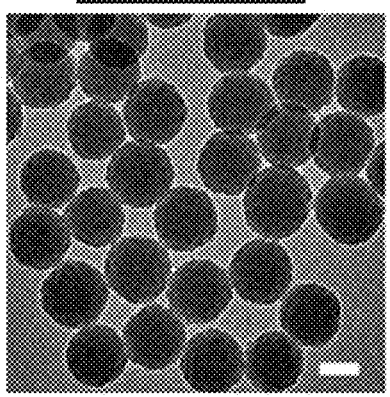
FIGS. 3A-C are TEM images of CS-SMNPs with core/shell ratios of: 160/0 nm (FIG. 3A), 160/36 nm (FIG. 3B), and 160/66 nm nm (FIG. 3C), respectively (scale bars, 100 nm). The dashed circles represent the boundary of the core and shell.
Figure 3B:
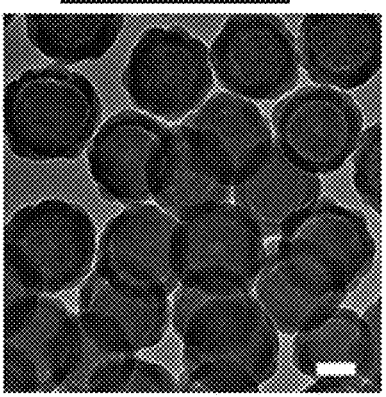
Figure 3C:
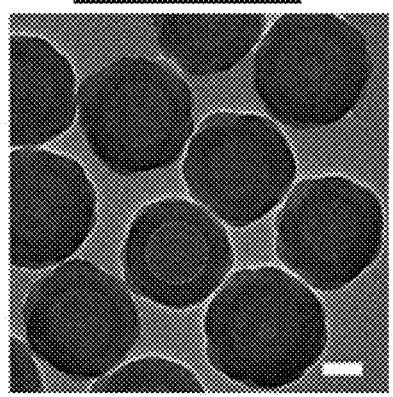

In these embodiments, the thickness of the shell may be controlled by the amount of TEOS used and/or the reaction time. It has been found that for SMNPs with diameter of 160 nm, for example, the $SiO_2$ shell thickness can be well controlled from 0 to 80 nm by adjusting the amount of TEOS, $H_2O$, and $NH_4OH$ as well as the reaction time in the range mentioned above. To demonstrate this, synthetic melanin cores with diameters from 120 to 160 nm were used and the coated shell thickness tuned from 36 to 66 nm by adjusting the reaction time and sol-gel precursor (TEOS) concentration (See Table 1). In FIGS. 3A-C, the core diameter of 160±7 nm was kept constant, and the shell thickness was changed from 0 to 66 nm (for example, core diameter/shell thickness values of 160/0, 160/36, and 160/66 nm). As can be seen by the results in Table 1, below, by controlling the amount of tetraethyl orthosilicate (TEOS) and hydrolysis reaction time to regulate the $SiO_2$ shell thickness of the CS-SMNPs produced (see details in Table 1, below), it is possible to produce numerous different colors after self-assembling them into micro-sized balls (supraball). While not wishing to be bound by theory, it is believed that by serving an analogous role to keratin in teal feathers, the shell helps to control the spacing between melanin nanoparticles, and therefore the color displayed when into they are formed supraballs, as described below.

TABLE 1

Synthesis conditions for different sized CS-SMNPs

| No. | Samples (nm) color | core | shell | SMNPs (mg) | $H_2O$ (ml) | 1-Propanol (ml) | $NH_4OH$ (μl) | TEOS (μl) | Reaction Time |
|---|---|---|---|---|---|---|---|---|---|
| 1 | Red | 161 ± 9 | 65 ± 8 | 3.25 | 0.88 | 5 | 125 | 64 | 18 h |
| 2 | Orange | 161 ± 9 | 50 ± 8 | 3.25 | 0.88 | 5 | 125 | 53 | 3.5 h |
| 3 | Olive | 161 ± 9 | 35 ± 7 | 3.25 | 0.88 | 5 | 125 | 40 | 75 min |
| 4 | Green | 123 ± 10 | 43 ± 9 | 3.25 | 0.88 | 5 | 125 | 82 | 3 h |
| 5 | Navy | 123 ± 10 | 36 ± 6 | 3.25 | 0.88 | 5 | 125 | 82 | 100 min |

As will be apparent, however, use of excessive amounts of TEOS may cause the CS-SMNPs to aggregate and/or lead to the production of pure solid $SiO_2$ nanoparticles. In one or more embodiments, the concentration of the TEOS added may be from about $1.6 \times 10^{-5}$ to about $6.0 \times 10^{-5}$, preferably from about $1.7 \times 10^{-5}$ to about $5.9 \times 10^{-5}$ and more preferably from about $1.79 \times 10^{-5}$, to about $5.86 \times 10^{-5}$. In addition, the pH value of the reaction mixture in these embodiments is kept at a pH of 10.6 or more. In addition, it has been found that the surface roughness of the CS-SMNPs can also change from a smooth surface to raspberry-like surface depending upon the conditions. It has been found in some embodiments that increasing the reaction time or water content are helpful to form a shell with relatively lower surface roughness.

In some other embodiments, the spacing and the regularity of the spacing between the melanin particles may also be regulated by low RI polymers, inorganic coatings or biological materials grafted onto or otherwise adhered to the shells of the CS-SMNPs or directly to the melanin particles (with optional cross linking for stability). Suitable materials for this purpose may include, without limitation, polystyrene, polymethylmethacrylate, polyethylene glycol, polyelectrolytes, chitin, keratin, and/or water soluble polymers. In one or more of these embodiments, the spacing can be controlled by varying the molecular weight of the grafted low RI polymers.

In a second aspect, the present invention is directed to the brightly colored and noniridescent supraballs that may be self-assembled from the CS-SMNPs discussed above, using the facile and scalable one-pot reverse emulsion process discussed in more detail below. (See, FIGS. 4, 5) As used herein, the term "iridescent" as applied to structural color refers to colors changes with the changes in the viewing angle of observer or sample directions with the respect to illuminating light direction, conversely the term "noniridescent" as applied to structural color refers to constant colors with the changes in the viewing angle of observer or sample directions with the respect to illuminating light direction. In various embodiments, these supraballs are solid and substantially spherical, with a diameter of from about 2 μm to about 150 μm. (See, FIGS. 6, 7A-C). However, the diameter of the supraballs is not of particular importance since the color displayed by the supraball is not dependent upon its size.

Figure 8A:
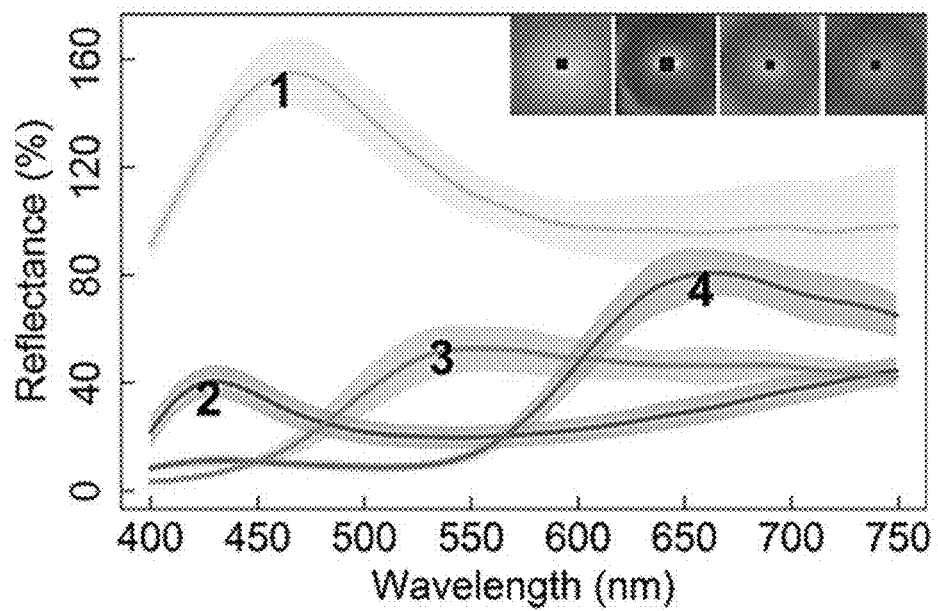
FIGS. 8A-C are graphs showing reflectance spectra.
Figure 8B:
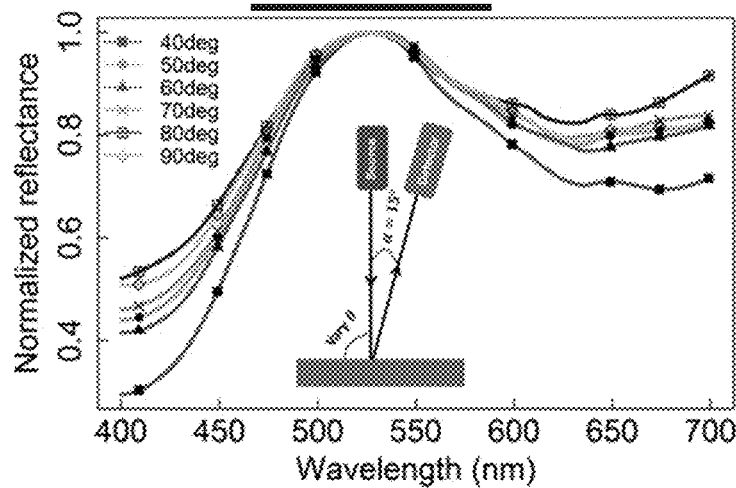
Figure 9:
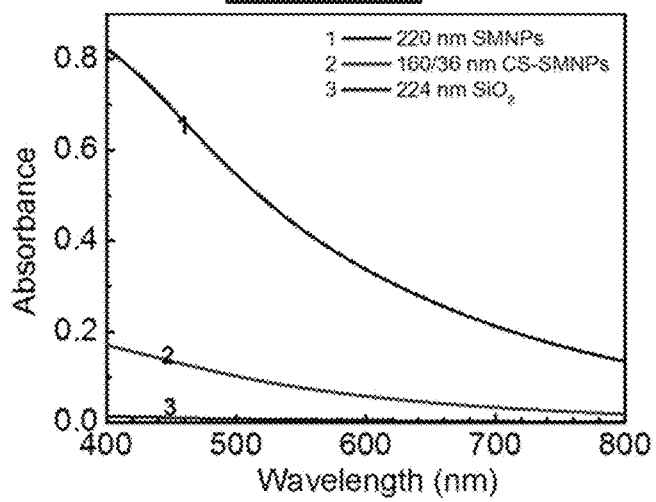
FIG. 9 is a graph showing UV-vis absorption spectra of pure SMNPs, CS-SMNPs, and pure silica nanoparticles in aqueous solution (20 mg/liter).
Figure 11:
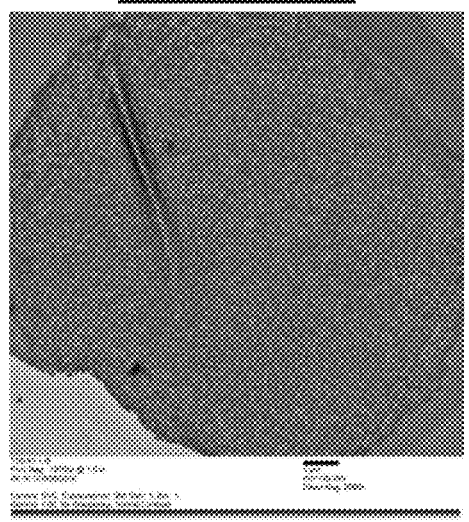
FIG. 11 is a representative TEM image of a small supraball made of 160/0-nm CS-SMNPs according to one or more embodiments of the present invention.

In one or more embodiments, the supraballs are comprised of a single type of CS-SMNPs, all having approximately the same overall diameter and shell thickness. In some other embodiments, however, the supraballs are comprised of two or more types of CS-SMNPs, having different SMNP diameters, different overall diameters and/or different shell thicknesses. In some embodiments, the supraballs may include other nanoparticles in addition to the CS-SMNPs, such as SMNPs, pure silica nanoparticles, polystyrene, polymethylmethacrylate, poly(N-isopropylacrylamide), carbon black, inorganic pigments, quantum dots, UV stabilizers, polymer nanoparticles, inorganic particles, solid silica nanoparticles, solid synthetic melanin nanoparticles, and combinations thereof As set forth above, these supraballs have been found to display relatively bright and non-iridescent structural colors. To evaluate these colors, supraballs consisting of four types of nanoparticles were synthesized as described below and investigated. Under the stereomicroscope (mostly collecting scattering light), supraballs made of CS-SMNPs having a SMNP diameter of 160 nm and a shell thickness of 36 nm (160/36) and having a SMNP diameter of 160 nm and a shell thickness of 66 nm (160/66) show highly visible olive and red colors, whereas supraballs made of 160/0-nm CS-SMNPs (no shell) appear almost black (FIGS. 5A-D). As a control, supraballs made of pure silica nanoparticles (224±16 nm) were also synthesized and evaluated, and were found to display whitish cyan color. (FIG. 5A) The reflectance spectra for individual supraballs contain one dominant peak in the visible spectral range located at ~430, ~540, and ~660 nm for supraballs composed of 160/0-, 160/36-, and 160/66-nm CS-SMNPs, respectively (FIG. 8A-B). The small variation in the curves from 12 different sizes of supraballs suggests that supraball size has no obvious influence on color. It was found, however, that the reflectance intensity of a single supraball increases with the thickness of the silica shell via reduced absorption by the CS-SMNPs (FIG. 9). The reflectance spectrum for silica particles has a dominant peak near 465 nm and is superimposed by a high-intensity, broad background signal that leads to a whitish color. It is believed that this broad background is due to higher incoherent scattering. The increase in light absorption and reduction in incoherent scattering of supraballs prepared from CS-SMNPs of various embodiments of the present invention produce more saturated colors that are visible to the naked eye. In addition, these colors are noniridescent, with clear advantages in applications such as wide-angle photonic inks (FIG. 8B). In addition, it is believed that supraballs prepared from CS-SMNPs of various embodiments of the present invention also produce more saturated colors in the infra-red and ultra-violet areas of the spectrum. In particular, supraballs made from CS-SMNPs with a larger diameter (generally over 500 nm) will produce wavelengths of light in the infra-red area of the spectrum and supraballs made from CS-SMNPs with a smaller diameter (generally less than 50 nm) will produce wavelengths of light in the ultra-violet area of the spectrum.

Figure 8C:
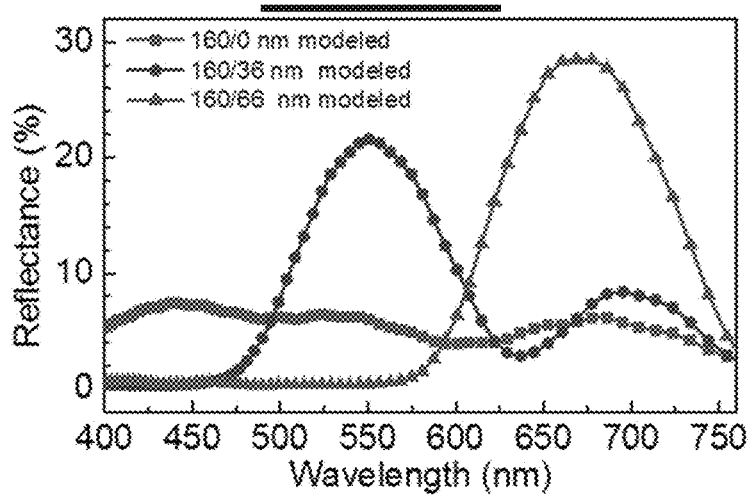
Figure 10A:
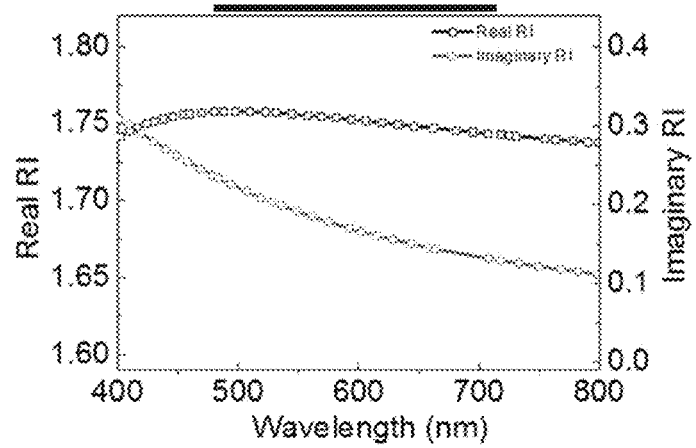
FIGS. 10A-B are graphs showing the results of FDTD simulations of reflectance spectra at normal incidence using the dimensions of the core-shell particles in supraballs where
Figure 10B:
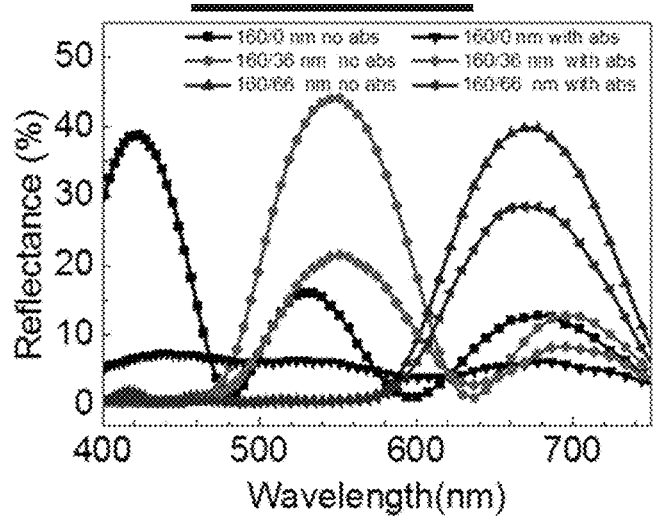

These empirical results were compared with theoretical predictions of colors of melanin-based supraballs using FDTD simulations. (See, FIG. 8C) As set forth above, a flat FCC photonic crystal consisting of six layers was modeled and the normal reflectance calculated from the (111) crystal plane without considering the curvature of the supraball surface. To consider the absorption of melanin, the RI and extinction coefficient of SMNPs reported in M. Xiao, Y. Li, M. C. Allen, D. D. Deheyn, X. Yue, J. Zhao, N. C. Gianneschi, M. D. Shawkey, A. Dhinojwala, "Bio-inspired structural colors produced via self-assembly of synthetic melanin nanoparticles." *ACS Nano* 9, 5454-5460 (2015) (the disclosure of which is incorporated herein by reference in its entirety) were used (FIG. 10A). It was found that incorporation of absorption terms in the simulation does not shift the peak position, but only reduces the reflectance intensity to a different extent, depending on the volume ratio of melanin cores (FIG. 10B). The calculated spectra for these supraballs contain a maximum peak position at ~440, ~550, and ~670 nm for 160/0-, 160/36-, and 160/66-nm CS-SMNPs, respectively (FIG. 8C). These predictions are in close agreement with the experimental measurements shown in FIG. 8A. The simulated spectra appear narrower than the experimental measurements because a flat perfect photonic crystal was used in the calculations, which is a simplified model for the structure used in the experiments. However, the agreement with the maximum peak position indicates that this simple model is able to capture the origin of colors of these supraball structures.

Figure 6:
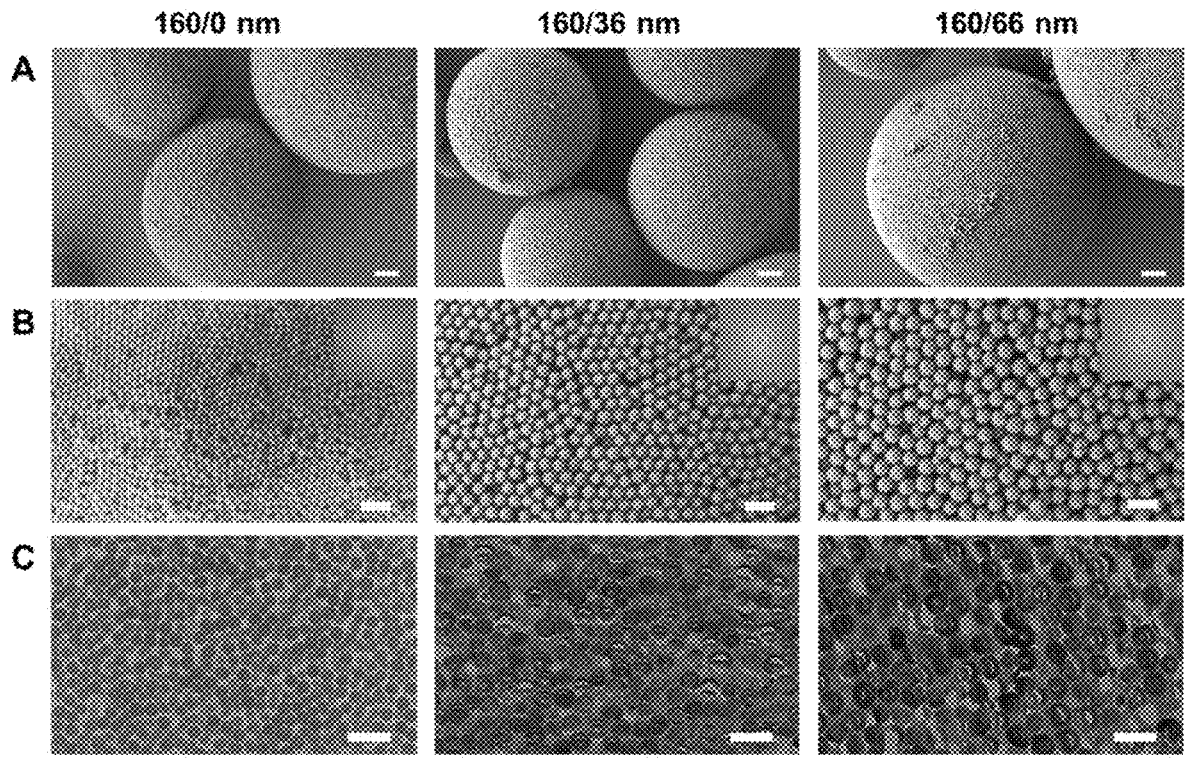
FIG. 6 is an array of SEM and TEM images comparing the microstructures of various supraballs prepared according to one or more embodiment of the present invention where row A shows SEM images showing whole supraball morphologies for supraballs made with 160/0 nm, 160/36 nm, and 160/66 nm CS-SMNPs (scale bars, 2 mm); row B shows high resolution SEM images of top surfaces of the supraballs made with 160/0 nm, 160/36 nm, and 160/66 nm CS-SMNPs and shown in row A (scale bars 500 nm); and row C shows cross-sectional TEM images of the inner structure of the supraballs made with 160/0 nm, 160/36 mu, and 160/66 nm CS-SMNPs shown FIG. 8A (scale bars 500 nm). Conversely each column shows SEM images showing the whole and top surface and a TEM showing a cross-section of supraballs made of a different size of CS-SMNPs.

Further electron microscopy was used to investigate the mechanistic basis of the structural colors of these supraballs. Scanning electron microscopy (SEM) results show that supraballs made according to various embodiments of the present invention are spherical and composed of close-packed nanoparticles (FIG. 6). High-resolution SEM images and two-dimensional fast Fourier transform power spectra reveal that the nanoparticles are quasi ordered on the supraball outer surfaces (FIG. 6). It is believed that the quasi-ordered packing helps to reduce the iridescence observed in well-ordered crystalline supraballs. Further, the spherical geometry of supraballs is understood to lead to display of noniridescent colors. Also, as set forth above, cross-sectional TEM images show that the supraballs are solid and filled with close-packed nanoparticles (FIGS. 6 (row C) and 11). This solid morphology likely prevents the supraballs from collapsing and improves durability.

In some embodiments, the structure of these supraballs may be stabilized by adding crosslinking functional groups on the surface, grafted polymers, or as additives. The crosslinking can be achieved by UV radiation, temperature, or pH changes, as described below.

Figure 4:
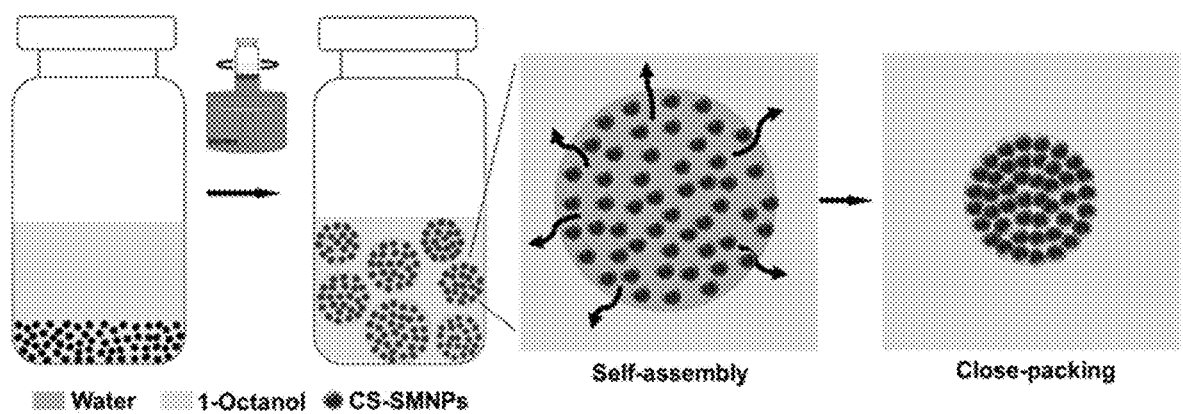
FIG. 4 is a schematic diagram showing the self-assembly of supraball structures via a reverse emulsion process according to one or more embodiments of the present invention.
Figure 5A:
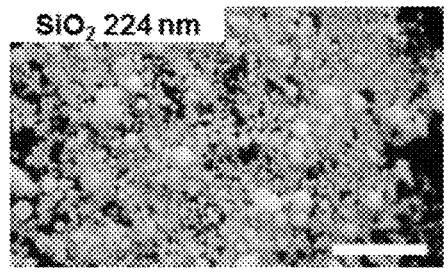
FIGS. 5A-D are optical images of supraballs made according to one or more embodiments of the present invention of four different types of nanoparticles: 224-nm pure silica nanoparticles (FIG. 5A) and 160/0 nm (FIG. 5B), 160/36 nm (FIG. 5C), and 160/66 nm (FIG. 5D) CS-SMNPs. Scale bars, 0.5 mm.
Figure 5B:
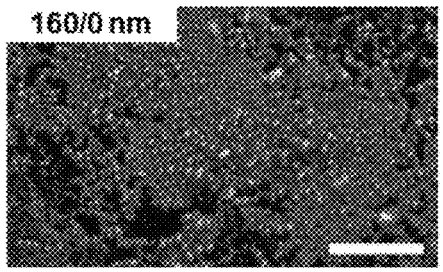
Figure 5C:
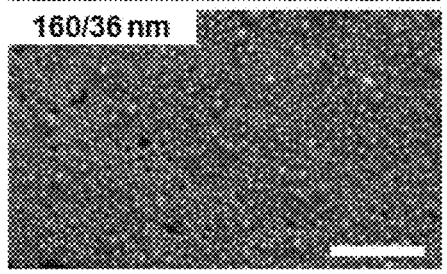
Figure 5D:
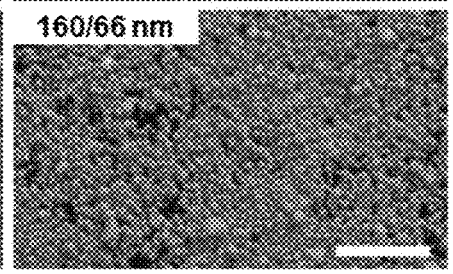

In another aspect, the present invention is directed to a method of making the brightly colored and non-iridescent CS-SMNP supraballs discussed above using a facile one-pot reverse emulsion process. In various embodiments, a simple water-in-oil reverse emulsion method was used to assemble CS-SMNPs into micrometer-sized supraballs. (FIG. 4). The solvents needed for self assembly of the CS-SMNPs of the present invention into supraballs are recyclable and cost-effective and the process is easily scalable allowing for production of supraballs on an industrial scale.

In one or more embodiments, the CS-SMNPs (and any other nanoparticle to be included in the supraball) are first suspended in water or an aqueous solution to form the aqueous phase of the reverse emulsion. In various embodiments, the concentration of said plurality of CS-SMNPs in the aqueous suspension is from about 1 mg/ml to about 100 mg/ml, and is preferably from about 20 mg/ml to about 80 mg/ml. The second (oil) phase is formed from a liquid material such as 1 propanol that is at least somewhat amphiphilic. In one or more embodiments, these materials are not sufficiently polar to dissolve into the aqueous phase but are sufficiently polar that they will absorb at least some water. 1-Octanol, for example, has a larger polar octane group that prevents it from diffusing into the inner water phase of the emulsion, but is sufficiently non-polar due to its terminal hydroxyl group to permit at least some water to diffuse into it.

In one or more embodiment, the liquid material used to form the oil phase will have an interfacial energy with water of from about 2 mJ/m$^2$ to about 55 mJ/m$^2$, and preferably from 5 mJ/m$^2$ to about 15 mJ/m$^2$. In some embodiments, the liquid material used to form the oil phase will have an interfacial energy with water of from about 2 mJ/m$^2$ to about 45 mJ/m$^2$, in other embodiments, from about 2 mJ/m$^2$ to about 35 mJ/m$^2$, in other embodiments, from about 2 mJ/m$^2$ to about 20 mJ/m$^2$, in other embodiments, from about 5 mJ/m$^2$ to about 55 mJ/m$^2$, in other embodiments, from about 10 mJ/m$^2$ to about 55 mJ/m$^2$, in other embodiments, from about 15 mJ/m$^2$ to about 55 mJ/m$^2$, and in other embodiments, from about 8 mJ/m$^2$ to about 10 mJ/m$^2$. Suitable materials for use as the second (oil) phase may include, without limitation, primary alcohols, secondary alcohols, tertiary alcohols, anilines, 1-octanol, pentanol, hexanol, heptanol, phenols, decanol, or a combination thereof, and combinations thereof. In various embodiments, the oil phase comprises 1-octanol.

Due to the limited solubility of water into the oil phase, the volume of the material used for the oil phase should be sufficient relative to the volume of the aqueous phase to ensure that it has sufficient solubility to allow substantially all of the water in the aqueous phase to migrate into the oil phase once the emulsion has been formed. As will be apparent, the volume to volume ratio of the oil phase to the aqueous phase in the emulsion will depend upon the capability of the oil phase material chosen to absorb water. The volume of material in the oil phase should be sufficient to accommodate, i.e. absorb, all of the water in the aqueous droplets in the emulsion in order to allow the CS-SMNPs to self-assemble into supraballs. One of ordinary skill in the art will be able to determine the volume of material to use in the oil phase (relative to the volume of the aqueous phase) necessary to form the CS-SMNP supraballs of the present invention without undue experimentation.

To form the water-in-oil reverse emulsion, the aqueous CS-SMNP suspension (water phase) and liquid material selected for the oil phase are combined in a container having hydrophobic interior walls to prevent the water droplets in the emulsion, once formed, from sticking to the sides of the container and being broken apart. As used herein, the term "hydrophobic" refers to a material have a contact angle, greater than 90 degrees Any container or reaction vessel having a sufficiently hydrophobic interior surfaces and/or any method known in the art for forming a hydrophobic coating on the internal surfaces of a container or vessel may be used. In one or more embodiment, a hydrophobic coating may be applied to the internal surfaces of a container or vessel as set forth in Example 7, below.

The reverse emulsion may be formed by any conventional method. Suitable methods may include, but are not limited to, a digital vortex, homogenizer, and/or mechanical/magnetic stirring. The force applied to form the emulsion should be enough to form the emulsion but not enough to cause the supraballs being formed to break apart. In one or more embodiments, the reverse emulsion is formed by a digital vortex at a shaking speed of from about 1400 rpm to about 1800 rpm for from about 2 min to about 5 min. In one or more embodiments, the reverse emulsion is formed by a digital vortex at a shaking speed of 1600 rpm for 2 min. No surfactant molecules are necessary to stabilize the emulsion, and the transient stable emulsion droplets may be formed upon shear mixing. While in some embodiments of the present invention a surfactant or other emulsification aid may be used, care must be taken to ensure that the surfactant or other emulsification aid chosen does not prevent or substantially hinder passage of the water molecules from the aqueous phase into the continuous (oil) phase.

As will be apparent, the emulsion will comprise numerous droplets of the aqueous phase containing the CS-SMNPs dispersed in the continuous oil phase. Once an emulsion having droplets of the desired size has been formed, however, the digital vortex or other mechanism used to create the emulsion should be slowed to allow the water in the aqueous phase to be more efficiently absorbed into the oil phase, without risking damage to the forming supraballs. As the water is slowly drawn out of the droplets in the aqueous phase, the CS-SMNPs are drawn together until they self assemble to form a well-ordered supraball, as described above. In some embodiments, the shaking speed of the digital vortex is reduced to a speed of from about 700 rpm to about 1300 rpm for from about 2 to about 5 minutes to allow the supraballs to be formed by the shrinking of the aqueous droplets as the water contained therein dissolves into the oil phase. In some embodiments, the shaking speed of the digital vortex is reduced to a speed of about 1000 rpm for about 3 minutes to allow the supraballs to form.

Once the supraballs have been formed, they may be collected and dried to a powder by any means known in the art for that purpose. In some embodiments, the supraballs are allowed to settle to the bottom of the reaction vessel and most of the supernatant is removed to concentrate the supraballs and the remaining supernatant is removed by evaporation. In some these embodiments, the evaporation time may be reduced by apply heat or a reduced pressure. In one or more embodiments, colorful supraballs may be obtained by removing the 1-octanol supernatant at 60° C.

In some other embodiments, the emulsion may be reversed and a standard oil-in-water emulsion used. In these embodiments, hydrophobic materials may be grafted to the CS-SMNPs or to the SMNPs to make them soluble in a substantially polar liquid, thereby forming an inner "oil" phase containing the CS-SMNPs. Suitable hydrophobic materials may include, without limitation, silanes, such as octadecyltrichlorosilane, or hydrophobic polymers, such as polydimethylsiloxane. In these embodiments, the material chosen for the continuous (water) phase will be at least somewhat amphiphilic, as was the case in the reverse emulsions discussed above. In these embodiments, however, the situation is reversed and the material chosen for the continuous (water) phase will be too polar to enter the "oil" phase, but sufficiently non-polar to absorb the substantially polar liquid out of the inner "oil" phase. Accordingly, when the oil-in water emulsion is formed the droplets containing the CS-SMNPs will shrink as the substantially polar liquid is absorbed into the continuous phase, forcing the CS-SMNPs to self-assemble into supraballs, as described above.

In one or more embodiments, the CS-SMNPs in the supraballs may be crosslinked to increase the structural stability and robustness of supraballs in different solvents and maintain the spherical shape and relatively ordered packing under both tension and compression. In these embodiments, polymers are grafted to the surface of the surface of the CS-SMNPs prior to supraball formation and then chemically crosslinked to increase the structural stability and robustness of supraballs. In various embodiments, these polymers will comprise one or more functional groups that will bind to (graft to) the low-RI shell material or high RI melanin core and one or more functional groups that can be crosslinked either directly or through a second crosslinking compound. In one or more embodiments, suitable functional groups for binding to (grafting to) the low-IR shell material or melanin core may include, without limitation, silane groups, polystyrene, polyethylene oxide, poly(methyl methacrylate), poly(N-isopropylacrylamide), block copolymers of these polymers, an/or combinations thereof. In one or more embodiments, suitable functional groups for crosslinking may include, without limitation, alkene groups or thiols. In various embodiments, these crosslinking functional groups may be capable of various orthogonal "click" type reactions known in the art. These "click" type reactions are well known in the art to robust, selective, efficient, and high yielding. Examples may include, without limitation, Huisgen cycloaddition reactions, copper (I) catalyzed azide-alkyne cycloaddition (CuAAC) reactions, thiol-ene radical addition reactions, oxime ligation reactions, Michael-addition reactions, Mannich-type addition reactions, "ene-type" addition reactions, strain promoted azide-alkyne cycloaddition (SPAAC) reactions, Diels-Alder reactions.

The size and molecular weight of the polymers is not particularly limited provided that they can be grafted to or from the low-RI shell material or high RI melanin core In various embodiments, these graft polymers will have a number average molecular weight of from about 10,000 g/mol to about 50,000 g/mol. In some embodiments, these graft polymers will have a number average molecular weight of from about 10,000 g/mol to about 45,000 g/mol, in other embodiments, from about 20,000 g/mol to about 50,000 g/mol, in other embodiments, from about 30,000 g/mol to about 50,000 g/mol, in other embodiments, from about 40,000 g/mol to about 50,000 g/mol, in other embodiments, from about 10,000 g/mol to about 40,000 g/mol, in other embodiments, from about 10,000 g/mol to about 30,000 g/mol, and in other embodiments, from about 10,000 g/mol to about 20,000 g/mol.

As will be appreciated, various polymers may be grafted to the silica shell or melanin core of the CS-SMNPs of the present invention. In various embodiments, suitable polymers may include Silane-PEG$_{1K}$-Acrylate (S-PEG-A) polystyrene, polymethylmethacrylate, polyethylene glycol, polyelectrolytes, chitin, keratin, and/or water soluble polymers.

In one or more of these embodiments, the surface of CS-SMNPs is first modified with Silane-PEG$_{1K}$-Acrylate (S-PEG-A). In various embodiments, the Silane-PEG$_{1K}$-Acrylate (S-PEG-A) will have the structure:

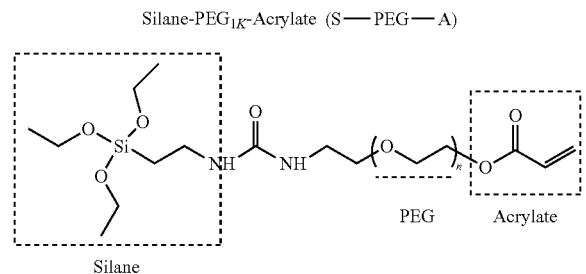

where n is an integer from about 10 to about 25. In some of embodiments, n is an integer from about 10 to about 23, in other embodiments, from 10 to 20, in other embodiments, from 10 to 18, in other embodiments, from 10 to 15, in other embodiments, from 12 to 25, in other embodiments, from 15 to 25, and in other embodiments, from 18 to 25. In some embodiments, n is about 15. In these embodiments, the CS-SMNPs and polymer are first dispersed in a solvent or solvent combination, such as ethanol and/or water, and a base, such as ammonia (NH$_4$OH). The S-PEG-A polymer is then dissolved in a suitable solvent such as ethanol and/or water and added slowly to the CS-SMNPs. In these embodiments, the mixture is then allowed to react for from 4 to 12 hours to allow the S-PEG-A polymer to attach to the surface of the CS-SMNPs. The S-PEG-A functionalized CS-SMNPs are then collected for use in supraball formation.

In one or more of these embodiments, the S-PEG-A functionalized CS-SMNPs are formed into supraballs as described above and then crosslinked. In these embodiments, the CS-SMNPs are cross linked to each by reactions of the crosslinking functional groups of the graft polymers either with each other if there are compatible functional groups or to one or more crosslinking compounds that have two or more functional groups that can react with the crosslinking functional groups of the graft polymers on different CS-SMNPs thereby linking them together to increase their structural stability and robustness of the supraball. The specific reaction mechanisms for these reactions, will, of course, depend upon the specific functional groups being used, but crosslinking reactions that can take place at room temperature and without the need for toxic and expensive catalysts or reagents are preferred. In various embodiments, the CS-SMNPs may be crosslinked via various "click" type reactions known in the art, such as thiol-ene Michael addition reactions. In various embodiments, the crosslinking agents may include, without limitation, multi-functional thiols or multi-functional alkynes.

In one or more embodiments, CS-SMNPs according to the present are modified with S-PEG-A graft polymers as described above and then crosslinked using a multi-functional PEG thiol such as a 4 arm-PEG$_{2K}$-Thiol (4 arm-PEG$_{2K}$-SH). In one or more of these embodiments, the 4 arm-PEG$_{2K}$-Thiol (4 arm-PEG$_{2K}$-SH) and will have four thiol terminated PEG chains each having a number average molecular weight ($M_n$) of about 2000 g/mol that are joined at a single carbon atom. In various embodiments, multi-functional PEG thiol crosslinking compound may have the formula:

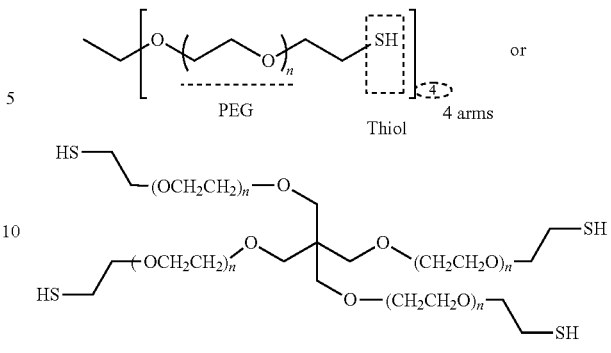

where each n is an integer from about 30 to about 60. In some of these embodiments, n may be an integer from about 30 to about 50, in other embodiments, from about 30 to about 40, in other embodiments, from about 40 to about 50, and in other embodiments, from about 50 to about 60.

In these embodiments, the S-PEG-A modified CS-SMNPs in the supraballs of the present invention are crosslinked via thiol-ene Michael addition reactions between the unsaturated carbonyl functional groups on the S-PEG-A modified CS-SMNPs and the thiols groups on the 4 arm-PEG$_{2K}$-Thiol (4 arm-PEG$_{2K}$-SH) under solvent free condition without the use of a catalyst at room temperature. In one or more of these embodiments, the use of triethylamine (TEA), or a higher temperature, or ultraviolet light may be used to accelerate the reaction, but are not needed for the reaction to proceed. In these embodiments, 4 arm-PEG$_{2K}$-SH (molar ratio of thiol to acrylate is 2) either with or without common solvents (0-1.0 ml), such as methanol, 2-propanol and chloroform, is added into the supraballs made from the S-PEG-A modified CS-SMNPs and reacted for from about 2 to about 12 h under shaking by vortex to crosslink the S-PEG-A modified CS-SMNPs in the supraball. In some embodiments, the reaction can also be accelerated by triethylamine (TEA), or a higher temperature, or Ultraviolet light.

In still other aspects of the present invention, the present invention relates to various methods of controlling the structural colors produced by the supraball compositions described above. As set forth above, it has been found that the color displayed by the CS-SMNP of the present invention is determined principally by the spacing and the regularity of the spacing between the melanin particles when they self assemble into the supraballs of the present invention. As will be apparent, in the tightly packed supraballs of the present invention, the melanin particles (cores) are separated by the shell and/or graft polymers on their surface. In some embodiments, the color displayed by the superball may be controlled by controlling the by the thickness of the shell and/or graft polymers on the surface of CS-SMNPs used to form the supraballs, and with it the spacing of the CS-SMNPs in the supraballs they form. For any given core size, it has been found that an increase in shell thickness results in an increase in the wavelength of light that will be displayed by supraballs made using those CS-SMNPs. Conversely, it has been found that a decrease in shell thickness results in a decrease in the wavelength of light that will be displayed by supraballs made using those CS-SMNPs. In this way, it is possible to, without undue experimentation, create supraballs that display a desired structural color or UV/IR reflection.

In some other embodiments, the color displayed by the supraballs of the present invention may be controlled by changing the by the ratio of the core diameter to the shell thickness or the core diameter to the overall diameter. As will be appreciated, varying the ratio of the core diameter to the shell thickness or the core diameter to the overall diameter will have the effect of changing the spacing and the regularity of the spacing between the melanin particles and with it the color displayed. For any given overall CS-SMNP diameter, it has been found that an increase in ratio of the core diameter to the shell thickness or the core diameter to the overall diameter results in an increase in the wavelength of light that will be displayed by supraballs made using those CS-SMNPs. Conversely, it has been found that a decrease in ratio of the core diameter to the shell thickness or the core diameter to the overall diameter results in a decrease in the wavelength of light that will be displayed by supraballs made using those CS-SMNPs. In this way, it is possible to, without undue experimentation, create supraballs that display a desired structural color.

In one or more other embodiments, the color displayed by the CS-SMNP may be controlled by varying their diameter while maintaining the same ratio of the core diameter to the shell thickness or the core diameter to the overall diameter. In these embodiments, an increase in the overall diameter of the CS-SMNP results in an increase in the wavelength of light that will be displayed by supraballs made using those CS-SMNPs and conversely, a decrease in the overall diameter results in a decrease in the wavelength of light that will be displayed by supraballs made using those CS-SMNPs.

Figure 7A:
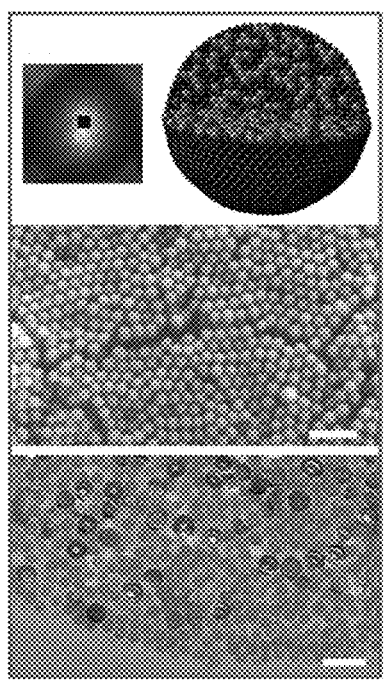
FIGS. 7A-C are images of supraballs from binary CS-SMNPs.
Figure 7B:
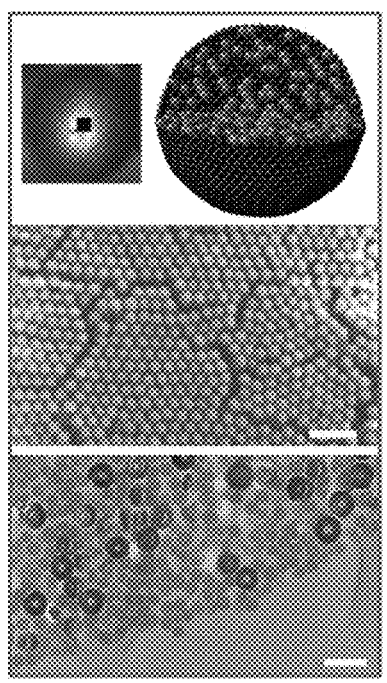
Figure 7C:
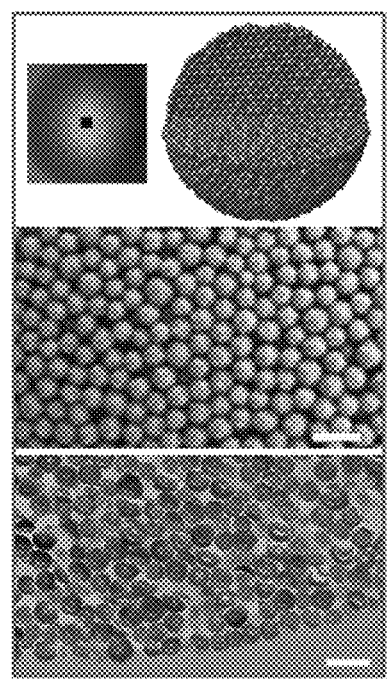
Figure 12A:
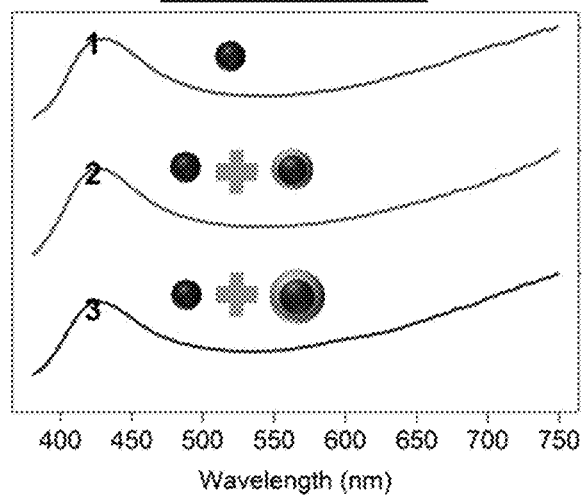
FIGS. 12A-B are graphs comparing reflectance spectra collected for single supraballs made of melanin, core-shell nanoparticles, and mixtures of melanin and core-shell nanoparticles, where
Figure 12B:
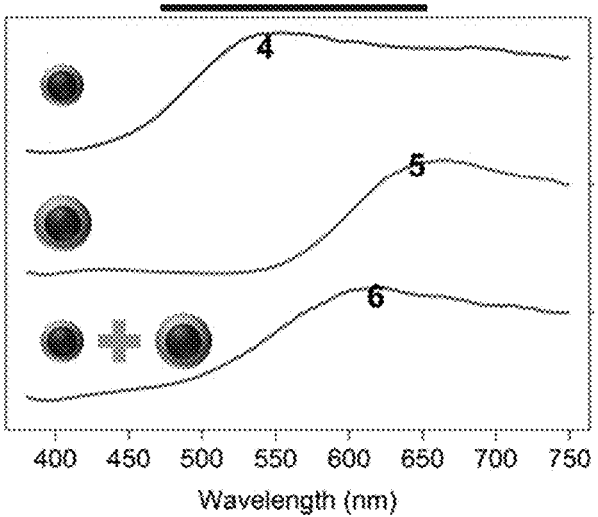
Figure 13A:
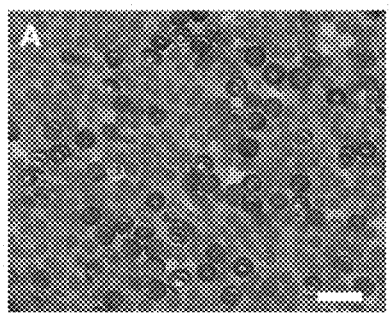
FIG. 13A-C are TEM images showing the inner structure of supraballs of binary CS-SMNPs containing A) 160/0-nm & 160/36-nm CS-SMNPs (FIG. 13A), 160/0-nm & 160/66-nm CS-SMNPs (FIG. 13B), and 160/36-nm & 160/66-nm CS-SMNPs FIG. 13C. Scale, 500 nm.
Figure 13B:
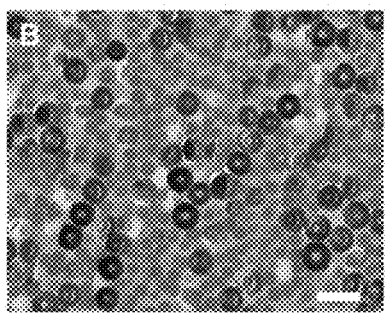
Figure 13C:
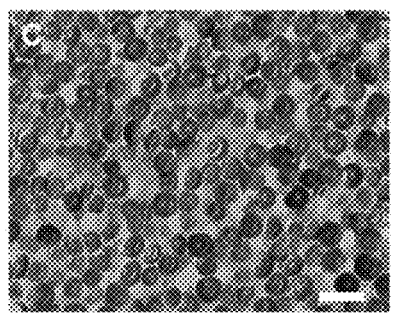
Figure 14:
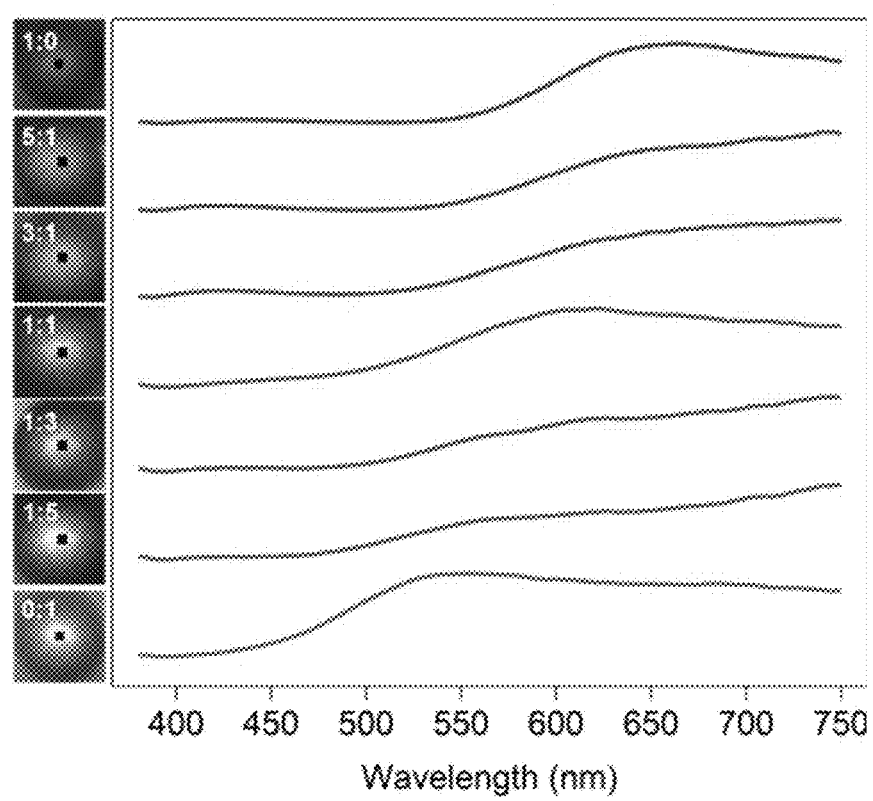
FIG. 14 is a graph comparing normal reflectance spectra of supraballs made from 160/66- and 160/36-nm CS-SMNPs, and supraballs made by mixing 160/66- and 160/36-nm CS-SMNPs at ratios of 5:1, 3:1, 1:1, 1:3, and 1:5 160/66-nm CS-SMNPs to 160/36-nm CS-SMNPs.

In some other embodiments, the color displayed by the supraballs of the present invention may be controlled by combining two or more different types CS-SMNPs, each of which would display a different color if used alone, and forming the combination into a supraball having a desired color. In various embodiments, these two or more different types CS-SMNPs may display different structural colors because they are of different sizes, have different core-shell ratios, have different shell thicknesses, the presence or absence of other nanoparticles and/or their relative amounts or ratios, etc., as set forth herein. Analogous to tuning pigmentary colors by mixing two types of pigments, the same reverse emulsion process may, in some embodiments, be used to assemble CS-SMNPs with binary sizes (same core diameter but different shell thicknesses) into supraballs. As can be seen in FIGS. 7A-B mixing pure SMNPs and CS-SMNPs with different shell thicknesses at a mass ratio of 1:1 resulted in a purple color similar to those produced by pure SMNP supraballs (FIGS. 7A-B and 12A). Both the SEM images of supraball outer surfaces and cross-sectional TEM images of these supraballs demonstrate that only pure SMNPs segregate to the surfaces after mixing with CS-SMNPs (FIGS. 7A-B). However, mixing two sizes of CS-SMNPs with 1:1 ratio by mass results in an orange color (FIGS. 7C and 12B), and nanoparticles of both sizes of CS-SMNPs are randomly mixed at the surface and in the bulk (FIG. 13A-C). The differences in blending and segregation of nanoparticles can be explained by the higher affinity of melanin than silica to the oil-water interface. Therefore, the addition of different ratios of CS-SMNPs enables us to tune colors without synthesizing new CS-SMNPs of different shell thicknesses (FIG. 14).

Figure 15A:
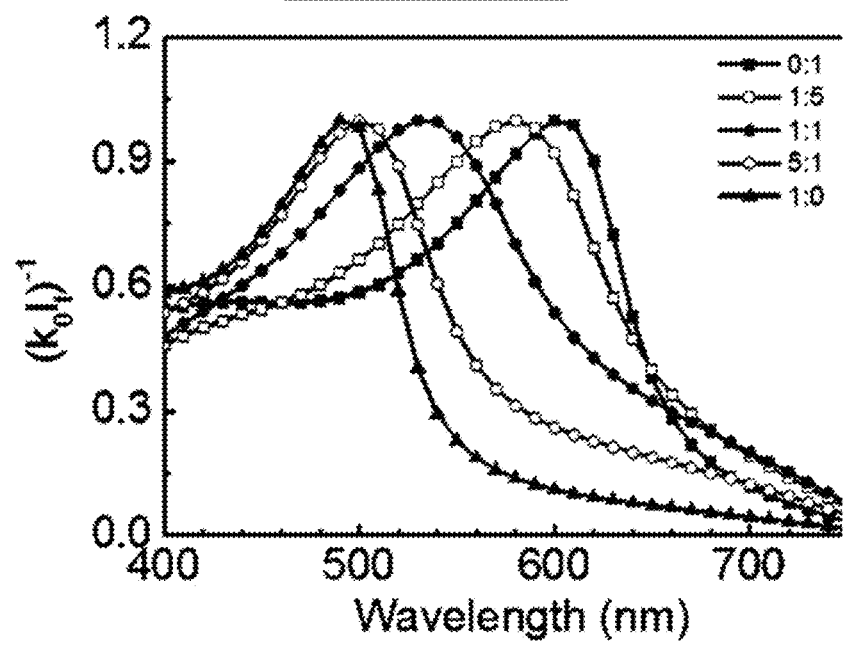
FIGS. 15A-B are graphs showing calculations of inverse of normalized transport mean free path as a function of different mixing ratios of 160/36-nm and 160/66-nm CS-SMNPs using the scattering theory outlined in Example 1 where a short-range order was taken into account (FIG. 15A) and using an independent scattering approximation without including the model for short-range order (FIG. 15B). The legend represents the mixing mass ratios of two sizes of CS-SMNPs.
Figure 15B:
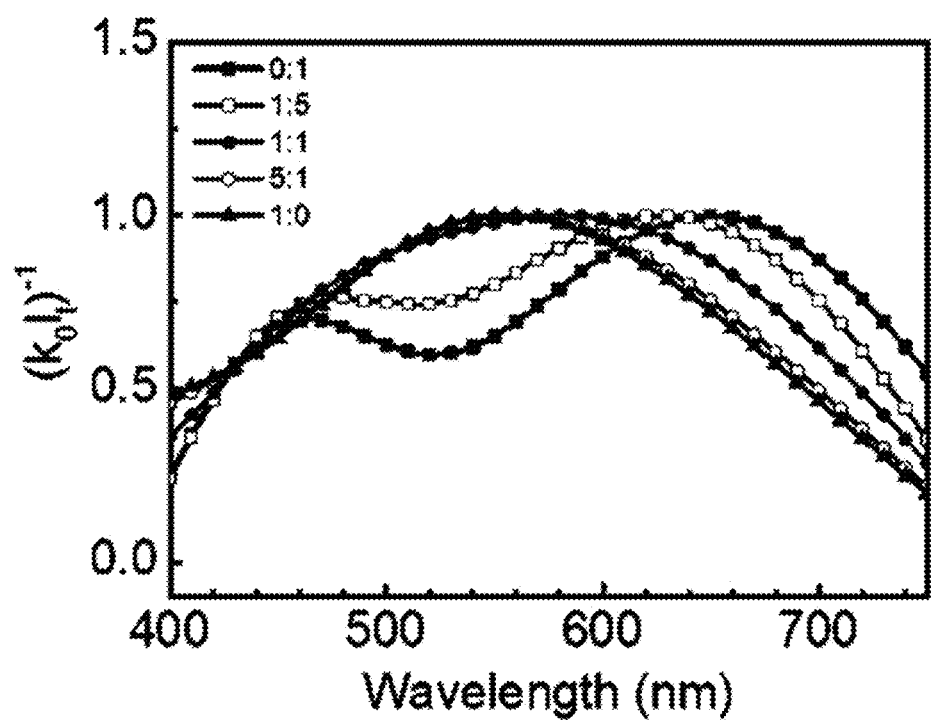

To understand the color blending effect, the inverse of normalized transport mean free path $(A=(k_0 l_t)^{-1})$ was used to calculate the scattering intensity of supraballs made of 160/36- and 160/66-nm CS-SMNPs. (See Example 1, below for details regarding these calculations; see also, M. C. W. van Rossum, T. M. Nieuwenhuizen, Multiple scattering of classical waves: Microscopy, mesoscopy, and diffusion. Rev. Mod. Phys. 71, 313-371 (1999) and P. Sheng, Introduction to Wave Scattering, Localization and Mesoscopic Phenomena, vol. 88 of Springer Series in Materials Science (Springer, 2006), the disclosures of which are incorporated herein by reference in their entirety). Compared with the model that assumes only independent scattering (simple summation of Mie scattering), the scattering model based on short-range order not only better captures the features of measured spectra but also predicts the color change with the variation in the mixing ratio of binary CS-SMNPs (FIG. 15A-B). Although the model considering the short-range order cannot precisely predict the reflectance peak positions, it suggests that the interference effect from the short-range order is critical for the color production in supraballs made of mixed CS-SMNPs.

In addition, in one or more embodiments of the present invention supraballs that display different colors can be combined is the same way as paints or pigments to provide a desired structural color.

In some embodiments, polymers may be used that can undergo changes on phase or structure under certain predetermined conditions such as temperature, pH, electronic or magnetic fields causing changes in the color produced in reaction to stimuli. The materials may be useful in the design sensors that are sensitive to temperature, pH, humidity, and external stimuli such as electric or magnetic fields.

Figure 16:
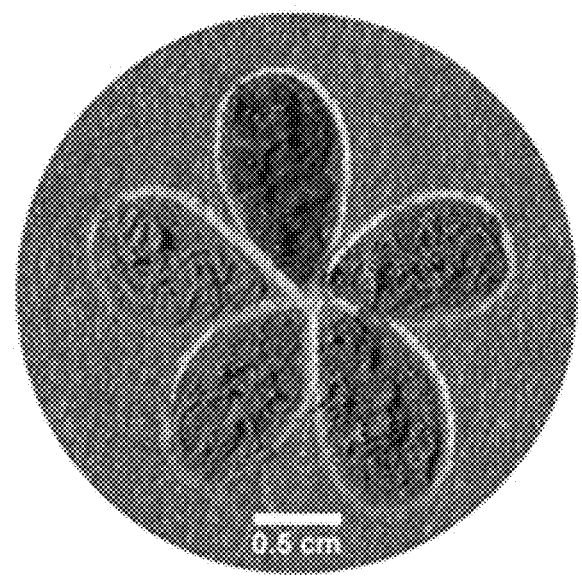
FIG. 16 is an image of a rainbow-like flower, painted with supraball inks made of five different sizes of CS-SMNPs: navy blue, 123/36 nm; blue-green, 123/43 nm; olive, 160/36 nm; orange, 160/50 nm; red, 160/66 nm.

As set forth above, these supraballs produce a full spectrum of colors depending on the sizes of CS-SMNPs (FIG. 16). This one-pot process is carried out at room temperature without additional posttreatment to remove water, and the supraballs can be easily separated by centrifugation. This process has a clear advantage over other emulsion-like processes used to produce colorful supraballs that require microwaves or heat to remove water and uses solvents that are cost effective and recyclable. In contrast to microfluidic approaches, the reverse emulsion method is also easily scalable to produce larger quantities of supraball particles and can be blended with various polymers to form a wide range of materials, including 3-D printable polymer resins that will exhibit structural color. Further, melanin-based supraballs also provide advantages of improving mechanical strength and can be blended with ingredients used to form make-up and cosmetics.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Optical Modeling
FDTD Simulation

A Lumerical FDTD solutions 8.15 was used to run the optical modeling. In the simulation, we created an FCC colloidal lattice with its plane (111) as X-Y plane and a plane wave light was injected down from Z direction, perpendicular to plane (111). For the simulation in FIG. 8A, we compared theoretical reflectance spectra from core-shell and homogenous nanoparticles. The homogenous nanoparticles is the same size as core-shell nanoparticles with a RI of averaged RI value of core-shell nanoparticles based on the equation, $$n_{homo}^2(V_{core}+V_{shell})=n_{core}^2 V_{core}+n_{shell}^2 V_{shell} \quad (1)$$

We set the RI value of 1.74 for high RI material (identical to synthetic melanin, but without any absorption) and 1.45 for the low RI material (same with fused silica) in our calculations. The lattice has 30 periods along the X and Y directions and 12 periods along Z directions. We chose auto non-uniform mesh type with accuracy of 6 and a light source range of 400-800 nm (mesh size is around 8 nm). Both core and shell materials contained no absorption so that we could decouple optical response from the core-shell structures and absorption. When comparing simulation results with experimental reflectance of supraballs (FIG. 8C), we considered absorption from SMNPs core. In this calculation, the Lumerical software used RI values from fitting of both the real part and imaginary part of RI values based on experimental data (FIG. 10A). Based on our observation that only the top 5~10 layers of supraball contributes to the colors, we calculated only 6 layers along z directions. We chose auto non-uniform mesh type with accuracy of 5 and a light source of 200-800 nm (mesh size is around 5 run).

Scattering Theory

Because the supraballs made of mixed type 1 (160/36 nm) and type 2 (160/66 nm) CS-SMNPs are far from the ordered FCC packing (FIG. 5C), we cannot simply regard them as photonic crystals. To consider the disorder effect, we used the multiple scattering theory to explain the color shifting from blending two sizes of CS-SMNPs with different mass ratio (See, M. C. W. van Rossum, T. M. Nieuwenhuizen, "Multiple scattering of classical waves: Microscopy, mesoscopy, and diffusion." *Rev. Mod. Phys.* 71, 313-371 (1999) and P. Sheng, "Introduction to Wave Scattering, Localization and Mesoscopic Phenomena," vol. 88 of Springer Series in Materials Science (Springer, 2006), the disclosures of which are incorporated herein by reference in their entirety). The multiple scattering theory of light can provide basic analytical methods to address light scattering problem in disordered photonic media. To predict the reflectance spectra profile analytically without resorting to time-consuming numerical simulations, here we define the parameter (A= $(k_0 l_t)^{-1}$ to present the diffuse reflectance of the supraballs, where $k_0 l_t=2\pi l_t/\lambda$. First, $I_t$ directly determines the diffuse reflectance of supraballs, which plays a key role in the production of structural colors. For the diffusive light transport without absorption, transmission is proportional to $I_t$ as T~$I_t$ and thus reflectance increases when $I_t$ is reduced (Id.). When the optical absorption of CS-SMNPs is considered, the reflectance is still negatively related to $I_t$, because smaller $I_t$ leads to a stronger multiple scattering effect (note $I_t$ doesn't rely on absorption), which is the only source of backscattering and thus diffuse reflectance (Id.).

Secondly, there are significant interference effects when $I_t$ is comparable with the wavelength $\lambda$ (A~1), which are also observed in the scenarios such as coherent backscattering and Anderson localization. Constructive interference effects lead to a reduction in diffusion constant D (i.e. coherent backscattering gives rise to a correction as $\Delta D/D \sim -A^2$) and thus an increase in reflectance, which can be also quantified by the parameter A. Therefore, we can use the parameter A to estimate spectral profile of diffuse reflectance. This parameter has also been used by F. Scheffold et al in predicting optical spectra of densely packed $TiO_2$ nanoparticles (See, M. Reufer, L. F. Rojas-Ochoa, S. Eiden, J. J. Sáenz, F. Scheffold, "Transport of light in amorphous photonic materials."*Appl. Phys. Lett.* 91, 171904 (2007), the disclosure of which is incorporated herein by reference in its entirety).

Since CS-SMNPs are densely packed in supraballs, the short-range order induced interference mechanism among binary CS-SMNPs in multiple scattering of light likely plays a key role in 1, as well as the observed reflectance spectra. To support this argument, here we consider the short-range order induced interference effect in the multiple scattering using a theoretical model where two-particle correlation is taken into account (known as Born's approximation) (See, generally, S. F. Liew, J. Forster, H. Noh, C. F. Schreck, V. Saranathan, X. Lu, L. Yang, R. O. Prum, C. S. O'Hern, E. R. Dufresne, H. Cao, "Short-range order and near-field effects on optical scattering and structural coloration." *Opt. Express* 19, 8208-8217 (2011), the disclosure of which is incorporated herein by reference in its entirety). Then we compare this result with that from the independent scattering approximation (ISA) without consideration of the short-range order. The theoretical model predicts the transport mean free path of light in supraballs as $I_t=(\rho\sigma_t)^{-1}$ where $\rho$ is the number density of particles. $\sigma_t$ is calculated in the following expression $$\sigma_t = \frac{\pi}{k^2}\int_0^\pi B(\theta)\sin(1-\cos\theta)d\theta \quad (2)$$

where $k=2\pi n_{eff}/\lambda$ and $B(\theta)=\alpha F_{11}(\theta)S_{11}(\theta)+(1-\alpha)F_{22}(\theta)S_{22}(\theta)+2\sqrt{\alpha(1-\alpha)}F_{12}(\theta)S_{12}(\theta)$.

We calculate effective refractive index $n_{eff}=\sqrt{\epsilon_{eff}}$ using the Maxwell-Garnett formula for three-component medium (core, shell, and air) as, $$\frac{\epsilon_{eff}-1}{\epsilon_{eff}+2} = f_{core}\frac{\epsilon_{core}-1}{\epsilon_{core}+2} + f_{shell}\frac{\epsilon_{shell}-1}{\epsilon_{shell}+2} \quad (3)$$

where $f_{core} =$ $$f_1\frac{r_{1,core}^3}{r_{1,total}^3} + f_2\frac{r_{2,core}^3}{r_{2,total}^3} \text{ and } f_{shell} = f_1\left(1-\frac{r_{1,core}^3}{r_{1,total}^3}\right) + f_2\left(1-\frac{r_{2,core}^3}{r_{2,total}^3}\right).$$

$f_1$ and $f_2$ are the volume fraction of type 1 and type 2 CS-SMNPs. $\epsilon_{core}$ and $\epsilon_{shell}$ are permittivity of core (synthetic melanin) and shell (silica). $r_{1,core}$ and $r_{1,total}$ are the core radius and total radius of type 1 CS-SMNPs, while $r_{2,core}$ and $r_{2,total}$ are the core radius and total radius of type 2 CS-SMNPs. $\alpha=N_1/(N_1+N_2)$ is the number fraction of type-1 CS-SMNPs. $S_{11}(\theta)$, $S_{12}(\theta)$, and $S_{22}(\theta)$ are partial structure factors of the binary-particle system calculated based on Percus-Yevick hard sphere model (See, M. S. Wertheim, "Exact solution of the Percus-Yevick integral equation for hard spheres." *Phys. Rev. Lett.* 10, 321-323 (1963), the disclosure of which is incorporated herein by reference in its entirety). The Percus-Yevick model is a sufficient approximation for calculating pair correlation function characterizing short-range order in packing hard-sphere systems. $F_{11}(\theta)$, $F_{12}(\theta)$, and $F_{22}(\theta)$ are form factors derived from the Mie theory for core-shell particles. They are calculated as follows:

$$F_{11}(\theta) = f_{s1}f_{s1}^* + f_{p1}f_{p1}^* \quad (4)$$

$$F_{22}(\theta) = f_{s2}f_{s2}^* + f_{p2}f_{p2}^* \quad (5)$$

$$F_{12}(\theta) = \text{Re}[f_{s1}f_{s2}^* + f_{p1}f_{p2}^*] \quad (6)$$

where $$f_{sj}(\theta) = \sum_{m=1}^{\infty}(2m+1)a_{m,j}\tau_m(\cos\theta) + b_{m,j}\pi_m(\cos\theta) \text{ and } f_{pj}(\theta) =$$

$$\sum_{m=1}^{\infty}(2m+1)a_{m,j}\pi_m(\cos\theta) + b_{m,j}\tau_m(\cos\theta)$$

with j=1,2 denoting different particle species. Here $\tau_m$ and $\pi_m$ are functions defined as $$\pi_m(\cos\theta) = -\frac{P_m^1(\cos\theta)}{\sin\theta} \text{ and } \tau_m(\cos\theta) = -\frac{dP_m^1(\cos\theta)}{d\theta},$$

where $P_m^1(\cos\theta)$ is the associated Legendre function. $a_{m,j}$ and $b_{m,j}$ are Mie coefficients calculated as, $$a_{m,j} = \frac{(\tilde{D}_{m,j}/n_{shell} + m/y_j)\psi_m(y_j) - \psi_{m-1}(y_j)}{(\tilde{D}_{m,j}/n_{shell} + m/y_j)\xi_m(y_j) - \xi_{m-1}(y_j)} \quad (7)$$

$$b_{m,j} = \frac{(n_{shell}\tilde{G}_{m,j} + m/y_j)\psi_m(y_j) - \psi_{m-1}(y_j)}{(n_{shell}\tilde{G}_{m,j} + m/y_j)\xi_m(y_j) - \xi_{m-1}(y_j)} \quad (8)$$

where $y_j = kr_{j,total}$ is the size parameter for the total radius of type-j particle and $k=2\pi n_{eff}/\lambda$ is the wavenumber in the surrounding medium with effective refractive index $n_{eff}$ as calculated previously. We defined $n=n_{shell}/n_{core}$, where $n_{shell}=\sqrt{\epsilon_{shell}}$ and $n_{core}=\sqrt{\epsilon_{core}}$ are complex refractive indices of shell and core materials. The parameters, $\tilde{D}_{m,j}$, $\tilde{G}_{m,j}$, are calculated as $$\tilde{D}_{m,j} = \frac{D_m(n_{shell}y_j) - A_{m,j}\chi_m'(n_{shell}y_j)/\psi_m(n_{shell}y_j)}{1 - A_{m,j}\chi_m(n_{shell}y)/\psi_m(n_{shell}y)} \quad (9)$$

$$\tilde{G}_{m,j} = \frac{D_m(n_{shell}y_j) - B_{m,j}\chi_m'(n_{shell}y_j)/\psi_m(n_{shell}y_j)}{1 - B_{m,j}\chi_m(n_{shell}y)/\psi_m(n_{shell}y)} \quad (10)$$

And $A_{m,j}$, $B_{m,j}$, are $$A_{m,j} = \psi_m(n_{shell}x_j)\frac{nD_m(n_{core}x_j) - D_m(n_{shell}x_j)}{nD_m(n_{core}x_j)\chi_m(n_{shell}x_j) - \chi_m'(n_{shell}x_j)} \quad (11)$$

$$B_{m,j} = \psi_m(n_{shell}x_j)\frac{D_m(n_{core}x_j)/n - D_m(n_{core}x_j)}{D_m(n_{core}x_j)/\chi_m(n_{shell}x_j) - \chi_m'(n_{shell}x_j)} \quad (12)$$

where $x_j = kr_{j,core}$ is the size parameter for the core radius of type-j particle.

In above equations, $\psi_m(\alpha)$, $\xi_m(\alpha)$ and $D_m(\alpha)$ are special functions defined using argument $\alpha$ as $\psi_m(\alpha)=\alpha\xi_m(\alpha)$, $\chi_m(\alpha)=-\alpha y_m(\alpha)$, $\xi_m(\alpha)=\alpha h_m^{(1)}(\alpha)$ and $D_m(\alpha)=\psi'_m(\alpha)/\psi_m(\alpha)$. Here $j_m(\alpha)$, $y_m(\alpha)$ and $h_m^{(1)}(\alpha)$ are spherical Bessel functions of the first kind and second kind, and spherical Hankel function of the first kind, in the order of n respectively (42). $\psi'_m(\alpha)$ and $\chi'_m(\alpha)$ denote the first-order derivative respect to argument $\alpha$.

Equations (7-12) are also applicable for homogeneous spheres by setting $r_{j,total}=r_{j,core}$.

We calculated the A parameter for supraballs consisting of binary CS-SMNPs with different mass ratios. FIG. 15A shows the normalized A for different mass ratios for 160/36 nm and 160/66 nm CS-SMNPs. A clear trend of blue-shift was observed when increasing the amount of 160/36 nm CS-SMNPs, which is consistent with the experimental observation.

As a comparison, we also calculated A without consideration of short-range order and interference effects (FIG. 15A), where we set the partial structure factors $S_{11}(\theta)=S_{22}(\theta)=1$, $S_{12}(\theta)=0$ and wavenumber $k=k_0=2\pi/\lambda$, unlike using $k=2\pi n_{eff}/\lambda$ in the short-range-order case because using the effective index also takes partial interference effects into account. This approximation for calculating transport mean free path is called independent scattering approximation (ISA). No significant shift of peaks was observed by changing the composition of binary CS-SMNPs, which was invalid according to experimental results. This finding supports our conclusion that short-range order plays the crucial role in producing the blended colors of supraballs when mixing binary sizes of CS-SMNPs.

Example 2

Characterization of Nanostructures in Bird Feathers

Iridescent wild turkey (*M. gallopavo*) breast feathers and green-winged teal (*A. crecca*) wing feathers were obtained from the University of Akron collection. The protocol used to prepare barbule cross sections for TEM is set forth in M. Xiao, A. Dhinojwala, M. Shawkey, "Nanostructural basis of rainbow-like iridescence in common bronzewing *Phaps chalcoptera* feathers." Opt. Express 22, 14625-14636 (2014), the disclosure of which is incorporated herein by reference in its entirety. Briefly, cut feathers were dehydrated using 100% ethanol and infiltrated with 15, 50, 70, and 100% Embed 812 resin (Electron Microscopy Sciences) every 24 hours. Next, the EMbed 812 resin and samples were placed into block molds and cured at 60° C. overnight. The blocks were trimmed and then cut 80-nm-thick sections on a microtome (Leica UC6, Leica Microsystems GmbH). The sections were placed onto copper grids for TEM imaging (JEM-1230, JEOL Ltd.). (See FIGS. 1A-B)

Example 3

Synthesis of CS-SMNPs

Pure SMNPs were first synthesized by oxidative polymerization of dopamine molecules (Sigma-Aldrich) under base environment following the procedure described in M. Xiao, Y. Li, M. C. Allen, D. D. Deheyn, X. Yue, J. Zhao, N. C. Gianneschi, M. D. Shawkey, A. Dhinojwala, "Bio-inspired structural colors produced via self-assembly of synthetic melanin nanoparticles." ACS Nano 9, 5454-5460 (2015), the disclosure of which is incorporated herein by reference in its entirety.

A silica shell ($SiO_2$) was then deposited on the surface of SMNPs via the modified Stöber method as shown in W.

Stöber, A. Fink, E. Bohn, "Controlled growth of monodisperse silica spheres in the micron size range." *J. Colloid Interface* Sci. 26, 62-69 (1968), the disclosure of which is incorporated herein by reference in its entirety. SMNPs (3.25 mg) were first dispersed in a mixture of 5-ml 2-propanol and 0.88-ml deionized water using an ultrasonic method followed by magnetic stirring. Then, 125 ml of ammonia solution ($NH_4OH$; 28 to 30%) was added and stirred for 10 min. The silica precursor, tetraethyl orthosilicate (TEOS, 25-82.5 µl), was continuously injected into the mixture to form $SiO_2$ shell on the surface of SMNPs due to the hydrolysis and condensation of TEOS under base environment. The amount of tetraethyl orthosilicate (TEOS) and hydrolysis reaction time were controlled to regulate the $SiO_2$ shell thickness (see Table 2, below). Finally, CS-SM NPs were collected by centrifuge, washed three times with deionized water, and redispersed in deionized water for use in supraball preparation.

TABLE 2

Conditions used for synthesizing different sizes of CS-SMNPs.

| Supraball Colors | Core diameter (nm) | Shell thickness (nm) | TEOS (µL) | Reaction Time |
|---|---|---|---|---|
| Red | 160 ± 7 | 66 ± 8 | 64 | 18 h |
| Orange | 160 ± 7 | 50 ± 8 | 53 | 3.5 h |
| Olive | 160 ± 7 | 36 ± 7 | 40 | 75 min |
| Blue-green | 123 ± 10 | 43 ± 9 | 82 | 3 h |
| Navy | 123 ± 10 | 36 ± 6 | 82 | 100 min |

Example 4

Synthesis of CS-SMNPs

Figure 2:
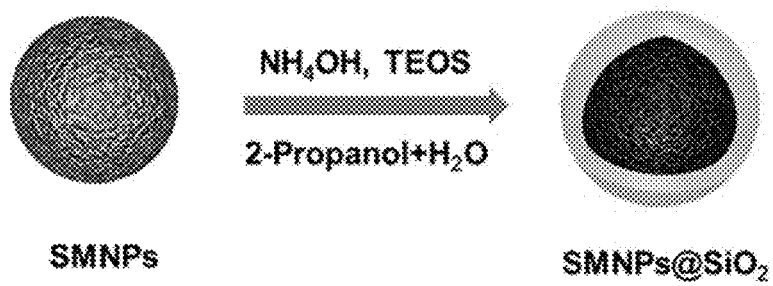
FIG. 2 is a schematic diagram describing synthesis silica-coated melanin nanoparticles by the deposition of a silica shell on a synthetic melanin nanoparticle.

A silica shell ($SiO_2$) was coated onto the surface of SMNPs core via the modified Stöber method (FIG. 2). Typically, SMNPs (3.25 mg) were firstly dispersed in a mixed solution of 2-propanol (5 ml) and deionized water ($H_2O$, 0.3-1.5 mL) using the ultrasound method followed by magnetic stirring. Then, ammonia solution ($NH_4OH$, 28 to 30%, 0.025-0.75 ml, pH>10.6) was added and stirred for 10 min. The silica precursor, tetraethyl orthosilicate (TEOS, 25-82.5 µl), was continuously injected into the mixture to form $SiO_2$ shell on the surface of SMNPs due to the hydrolysis and condensation of TEOS under base environment. The reaction was conducted at room temperature under constant stirring for 30 min-24 h. The SMNPs core $SiO_2$ shell NPs (SMNPs@$SiO_2$) were finally collected by centrifuge, washed with deionized water for three times and re-dispersed in deionized water for future use in supraball preparation.

Example 5

Characterization of CS-SMNPs

To examine the core-shell morphology and particle distributions, CS-SMNPs were drop-casted onto a carbon-coated copper grid for TEM (JEM-1230, JEOL Ltd.). Around 40 CS-SMNPs were measured using ImageJ software to obtain particle size and SD. the UV-visible (UV-vis) absorption of aqueous solutions of CS-SMNPs and solid silica particles were also measured using a UV-1800 UV-vis spectrometer (Shimadzu Corporation).

Example 6

General Method for Supraball Preparation

Typically, a solution of 30-ml aqueous CS-SMNPs having a concentration of 30 mg/ml was added to 1-ml anhydrous 1-octanol (Sigma-Aldrich). A water-in-oil emulsion was formed rapidly using a digital vortex (Genie 2, Scientific Industries) at a shaking speed of 1600 rpm for 2 min. The shaking speed was then reduced to 1000 rpm for 3 min when supraballs were formed by the shrinking of the aqueous droplets as the water contained therein with dissolving into the oil phase. After supraball sediments settled down, most of the supernatant (0.9 ml) was removed to concentrate the supraballs. Colorful supraballs were obtained by removing the 1-octanol at 60° C.

Example 7

Application of Hydrophobic Coating to Reaction Vessel

In this method, it was also important to make the glass vials hydrophobic so that aqueous droplets did not adhere to them and break upon contact. An octadecyltrimethoxysilane (OTS) self-assembled monolayer (SAM) was coated onto the inside of the glass vials to be used in forming the supraballs following a modified protocol (See, Y. Zhang, E. Anim-Danso, S. Bekele, A. Dhinojwala, Effect of surface energy on freezing temperature of water. ACS Appl. Mater. Interfaces 8, 17583-17590 (2016), the disclosure of which is incorporated herein by reference in its entirety). A 2-volume % OTS toluene solution was added into dry and clean glass vials and degassed for 15 min before tightly closing the cap. After 16 hours at room temperature, the vials were rinsed three times with toluene and ethanol. Finally, the vials were annealed at 120° C. under vacuum for 2 hours. To quantify whether OTS SAM was successfully grown onto glass vial, a clean glass slide was placed inside the vial during the OTS growth and measured the contact angle of the glass slide (water contact angle, 112°±0.6°).

Example 8

Supraball Characterization

The dried supraballs were imaged under a Leica M80 stereo microscope (Leica Microsystems), and high-density Teflon tape (TaegaTech) was used as a white balance. The microscope contained light emitting diode lights as the source and was connected to a Leica DMC 4500 camera. The reflectance spectrum of individual supraballs was measured using a CRAIC AX10 UV-vis-near-infrared microspectrophotometer (CRAIC Technologies Inc.), with a 75-W xenon short-arc lamp (Ushio UXL75XE) as a light source. Spectra from 12 supraballs were averaged and the SD calculated using pavo package in R programming software. To investigate whether the colors of supraballs are angle-independent, thick films of supraballs were deposited and the scattering spectra from different angles measured using an AvaSpec spectrometer, with a xenon light source (Avantes Inc.) attached to a custom-built goniometer (FIG. 8B)

The nanostructure of supraball surfaces was characterized using a field-emission SEM (JEOL-7401, JEOL Ltd.). To investigate the inner structure of supraballs, powders of supraballs were dispersed into EMbed 812 resin in block molds and cured them at 60° C. for 16 hour. The hard blocks were trimmed to a sharp trapezoidal tip using a Leica S6 EM-Trim 2 (Leica Microsystems), and 80-nm-thick sections were then cut using a diamond knife (Diatome Ltd.) on a Leica UC7 ultramicrotome for TEM.

Example 9

Formation of CS-SMNPs with Graft Polymers

First, CS-SMNPs (40 mg) were dispersed in the solvent mixture of ethanol (3 ml), $H_2O$ (1 ml) and $NH_4OH$ (40 µl). Next, S-PEG-A (17 mg, 1348 g/mol) was dissolved in a solvent mixture of ethanol (1.5 ml) and $H_2O$ (0.5 ml) and then added to the above CS-SMNP mixture dropwise. The mixture was allowed to react under room temperature for 5 h with magnetic stirring to form CS-SMNPs with PEG polymers containing unsaturated carbonyl(acrylate) (alkene) end groups grafted to its surface. These modified CS-SMNPs were collected by centrifuge and washed three times with $H_2O$ for future use in supraball preparation.

Example 10

Crosslinking of CS-SMNPs with Graft Polymers

The CS-SMNPs containing the grafted polymer of Example 9 were used to form supraballs using the method described in Example 9, above. After supraball sediments settled down, most of the supernatant (0.9 ml) was removed to concentrate the supraballs. Then, 4 arm-$PEG_{2K}$-SH (2.4 mg, molar ratio of thiol to acrylate is 2) either with or without common solvents (0-1.0 ml), such as methanol, 2-propanol and chloroform, was added into supraballs and reacted for 3 h under shaking by vortex. As will be appreciated, this reaction can also be accelerated by triethylamine (TEA), a higher temperature, or Ultraviolet light.

In light of the foregoing, it should be appreciated that the present invention significantly advances the art by providing a CS-SMNP and supraball that display structural color that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A core-shell nanoparticle capable of self assembly into a supraball for providing structural color comprising an inner high refractive index (RI) core and an outer low RI shell, wherein said inner high refractive index (RI) core comprises natural or synthetic melanin.

2. The core-shell nanoparticle of claim 1 wherein said wherein the outer low RI shell comprises silica.

3. The core-shell nanoparticle of claim 1 wherein said natural or synthetic melanin core has a diameter from about 50 nm to about 500 nm.

4. The core-shell melanin nanoparticle of claim 2 wherein said silica shell has a thickness of more than 0 nm- and 200 nm or less.

5. The nanoparticle of claim 2, wherein the ratio of the diameter of the melanin core to the diameter of said core shell synthetic melanin particle is more than 0 and 1 or less.

6. The core-shell nanoparticle of claim 1 having a diameter of from about 50 nm to about 700 nm.

7. The nanoparticle of claim 1 having a refractive index (RI) of from about 1.40 to about 2.0.

8. The nanoparticle of claim 1 wherein said outer low RI shell comprises silica, polymers, cross linkable polymers, inorganic coatings, biological materials or a combination thereof.

9. The nanoparticle of claim 1 further comprising a surface to which a material selected from the group consisting of cross linkable polymers, polar coatings, inorganic coatings, biological materials and a combination thereof are grafted or attached.

10. A method of making the core-shell nanoparticle of claim 2 comprising:
   A) preparing a synthetic melanin nanoparticle by the oxidative polymerization of dopamine in the presence of a base; and
   B) depositing a silica shell ($SiO_2$) on the synthetic melanin nanoparticle to form the core-shell synthetic melanin nanoparticle of claim 2.

11. The method of claim 10 wherein the synthetic melanin nanoparticle prepared in step A has a diameter of from about 120 nm to about 220 nm.

12. The method of claim 10 wherein the silica shell deposited on said synthetic melanin nanoparticle in step A has a thickness of in an amount greater than 0 nm and 200 nm or less.

13. The method of claim 10 wherein the step of depositing a silica shell (step B) comprises:
   1) Dispersing the synthetic melanin nanoparticle in a mixture of 2-proponol and water with a volume ratio of 1:0.176;
   2) Adding an ammonia solution to the dispersion of step 1; and
   3) Adding tetraethyl orthosilicate (TEOS) into the mixture of step 3 to form a $SiO_2$ shell on the surface of SMNPs due to the hydrolysis and condensation of TEOS onto the surface of the SMNPs under a base environment.

14. The method of claim 10 wherein step 3 further comprises controlling the thickness of the silica shell deposited on said synthetic melanin nanoparticle by varying the amount of tetraethyl orthosilicate (TEOS) used to form said silica shell and/or by varying the reaction time for the hydrolysis reaction of step 3 to obtain a core-shell synthetic melanin nanoparticle that when formed into a supraball will display a desired structural color.

15. A scalable process for the production of structural colors containing the core-shell nanoparticle of claim 1 comprising:
   A) preparing a plurality of core-shell nanoparticles, having a polar or nonpolar outer surface;
   B) suspending said plurality of core-shell nanoparticles in a polar or non-polar liquid, depending on the polarity of the outer surface;
   C) adding an amphiphilic liquid to the suspension of step B to provide a two-phase mixture having a first phase comprising the amphiphilic liquid and a second phase comprising the suspension of step B, wherein said amphiphilic liquid is not soluble in the suspension of step B but the polar or non-polar liquid in the suspension of step B is at least partially soluble in said amphiphilic liquid;
   D) forming an emulsion from the two-phase mixture of step C, said emulsion having a phase comprising the amphiphilic liquid of step C and an inner phase comprising the suspension of step B;
   E) allowing the polar or non-polar liquid in said plurality of droplets to be absorbed into said continuous phase to produce a plurality of supraballs comprising closely packed core-shell nanoparticles suspended in said continuous phase; and F) removing the amphiphilic liquid to produce a powder comprising the supraballs of step E that display a structural color and contain the core-shell nanoparticles of claim 1.

16. The scalable process for the production of structural colors of claim 15 wherein said plurality of core-shell nanoparticles in step A comprises a melanin inner core and an outer silica shell.

17. The scalable process for the production of structural colors of claim 15 wherein said plurality of core-shell nanoparticles in step A comprises a combination of two or more sets of core-shell nanoparticles, wherein each set of said two or more sets of core-shell nanoparticles would each display a different structural color if formed into a supraball.

18. The scalable process for the production of structural colors of claim 15 further comprising adding one or more nanoparticles selected from the group consisting of carbon black, inorganic pigments, quantum dots, UV stabilizers, polymer nanoparticles, inorganic particles, solid silica nanoparticles, solid synthetic melanin nanoparticles, core-shell melanin nanoparticles, and combinations thereof to the suspension of step B.

19. The scalable process for the production of structural colors of claim 15 wherein said polar or non-polar liquid is water or an aqueous solution.

20. The scalable process for the production of structural colors of claim 15 wherein said polar or non-polar liquid is primary alcohol, secondary alcohol, tertiary alcohol, anilines, 1-octanol, pentanol, hexanol, heptanol, phenols, decanol, or a combination thereof.

21. The scalable process for the production of structural colors of claim 15 wherein said plurality of core-shell nanoparticles is suspended in a non-polar liquid and steps E and F are performed in a vessel having a hydrophobic inner surface.

22. The scalable process for the production of structural colors of claim 15 wherein said plurality of core-shell nanoparticles is suspended in a polar liquid and steps D and E are performed in a vessel having a lipophobic inner surface.

23. The scalable process for the production of structural colors of claim 15 wherein the concentration of said plurality of core-shell nanoparticles in the suspension of step B is from about 1 mg/ml to about 100 mg/ml.

24. The scalable process for the production of structural colors of claim 15 wherein the step of forming an emulsion (step D) is performed using a digital vortex to disperse the suspension of step B into droplets within the amphiphilic liquid and the step of allowing the polar or non-polar liquid in said plurality of droplets to be absorbed into said continuous phase (step E) is performed by reducing the shaking speed of said digital vortex.

25. The scalable process for the production of structural colors of claim 15 wherein the amphiphilic liquid has an interfacial energy with water of from about 2 mJ/m$^2$ to about 55 mJ/m$^2$.

26. The scalable process for the production of structural colors of claim 15 wherein the step of removing the amphiphilic liquid to produce a powder comprises:
1) Concentrating the supraballs in the suspension of step E using by centrifugation and removing the amphiphilic liquid supernatant; and
2) Removing the remaining amphiphilic liquid to produce the powder of step F.

27. The scalable process for the production of structural colors of claim 15 further comprising:

G) repeating steps A-GF using second set of core-shell synthetic melanin nanoparticles to produce a second powder having a second structural color that is different from the structural color of the powder of step F; and
I) combining the powder of step G with the powder of step F to produce a third powder that displays a third structural color comprised of the structural color of the powder of step G and the structural color of the powder of step F.

28. A scalable process for the production of structural colors containing the core-shell nanoparticle of claim 1 comprising:
A) preparing a plurality of core-shell synthetic melanin nanoparticles;
B) suspending said plurality of core-shell synthetic melanin nanoparticles in water or an aqueous solution;
C) adding an amphiphilic liquid to the suspension of step B to provide a two-phase mixture having an oil phase comprising the amphiphilic liquid and a water phase comprising the suspension of step B, wherein said amphiphilic liquid is not soluble in the suspension of step B but the water or aqueous solution of step B is at least partially soluble in said amphiphilic liquid;
E) forming a water-in-oil emulsion from the two phase mixture of step C, said water-in-oil emulsion having an oil phase comprising said amphiphilic liquid of step C and a water phase comprising the suspension of step B; and
F) allowing the water or aqueous solution in said plurality of water droplets to be absorbed into said oil phase to produce a plurality of supraballs comprising closely packed core-shell synthetic melanin nanoparticles suspended in said oil phase;
G) removing the amphiphilic liquid to produce a powder comprising the supraballs of step F that display a structural color and contain the core-shell synthetic melanin nanoparticles of claim 1.

29. A method for providing supraballs that show a desired structural color using the core-shell synthetic nanoparticles of claim 1 comprising varying the thickness of the outer low RI shell of said core-shell nanoparticles to arrive at core-shell nanoparticles that will show the desired structural color when formed into a supraball, wherein an increase in outer low RI shell thickness results in an increase in the wavelength of the color displayed and a decrease in outer low RI shell thickness results in a decrease in the wavelength of the color of supraballs.

30. The method of claim 29 wherein said core-shell nanoparticles are core-shell synthetic melanin nanoparticles and said outer low RI shell comprises silica.

31. A method of controlling the wavelength of visible light displayed by the core-shell nanoparticle of claim 1 comprising varying the ratio of the diameter of the inner high RI core to the diameter of said core shell particle to arrive at core-shell nanoparticles that will display the desired structural color when formed into a supraball, wherein an increase in the ratio of the diameter of the inner high RI core to the diameter of said core shell synthetic melanin particle results in an increase in the wavelength of the color displayed and a decrease in the ratio of the diameter of the inner high RI core to the diameter of said core shell particle results in a decrease in the wavelength of the color displayed said supraball.

32. The method of claim 31 wherein said core-shell nanoparticles are core-shell synthetic melanin nanoparticles and said outer low RI shell comprises silica.

* * * * *